US009292482B1

(12) United States Patent
Thiesen et al.

(10) Patent No.: US 9,292,482 B1
(45) Date of Patent: Mar. 22, 2016

(54) SYSTEM AND METHOD FOR CONVERGENT DOCUMENT COLLABORATION

(71) Applicant: WORKIVA INC., Ames, IA (US)

(72) Inventors: Michael J. Thiesen, Bozeman, MT (US); Dominic J. Frost, Bozeman, MT (US); Stephen Bush, Missoula, MT (US); Grant Nelson, Bozeman, MT (US); Benjamin Echols, Bozeman, MT (US)

(73) Assignee: Workiva Inc., Ames, IA (US)

( * ) Notice: Subject to any disclaimer, the term of this patent is extended or adjusted under 35 U.S.C. 154(b) by 0 days.

(21) Appl. No.: 14/808,029

(22) Filed: Jul. 24, 2015

Related U.S. Application Data

(60) Provisional application No. 62/155,000, filed on Apr. 30, 2015.

(51) Int. Cl.
  *G06F 15/16* (2006.01)
  *G06F 17/24* (2006.01)
  *G06F 17/30* (2006.01)
  *H04L 29/06* (2006.01)

(52) U.S. Cl.
  CPC .......... *G06F 17/24* (2013.01); *G06F 17/30011* (2013.01); *G06F 17/30327* (2013.01); *H04L 65/403* (2013.01)

(58) Field of Classification Search
  None
  See application file for complete search history.

(56) References Cited

U.S. PATENT DOCUMENTS

| 4,807,182 | A | 2/1989 | Queen |
| 6,230,173 | B1 * | 5/2001 | Ferrel ................... G06F 17/218 715/205 |
| 6,792,454 | B2 * | 9/2004 | Nakano ............... G06F 17/3089 707/999.01 |
| 7,124,362 | B2 | 10/2006 | Tischer |
| 7,249,314 | B2 * | 7/2007 | Walker ................... G06F 17/24 715/205 |
| 7,496,841 | B2 | 2/2009 | Hadfield et al. |
| 7,587,471 | B2 * | 9/2009 | Yasuda ................. G06F 3/0607 709/220 |

(Continued)

OTHER PUBLICATIONS

Grishchenko, "Deep Hypertext with Embedded Revision Control Implemented in regular Expressions," Proceedings of the 6th International Symposium on Wikis and Open Collaboration, ACM, 2010, 10 pages.

(Continued)

*Primary Examiner* — Ranodhi Serrao
(74) *Attorney, Agent, or Firm* — Drinker Biddle & Reath LLP

(57) ABSTRACT

A method is implemented on a server, the method includes storing, on a database of the server, a causal tree structure corresponding to a document, where the causal tree structure includes a sequence of editing instructions and each editing instruction is assigned an identifier unique to such editing instruction. The method further includes receiving, at the server, a user editing instruction for the document, where the user editing instruction is assigned an identifier unique to the user editing instruction. The method includes storing, using a processor of the server, the user editing instruction and the identifier assigned to the user editing instruction as an additional node to the causal tree structure. The method further includes broadcasting, to a plurality of client devices connected to the server, the user editing instruction and the identifier assigned to the user editing instruction.

24 Claims, 16 Drawing Sheets

(56) References Cited

U.S. PATENT DOCUMENTS

| | | | | |
|---|---|---|---|---|
| 8,015,235 | B1* | 9/2011 | Bauer | G06F 9/5061 |
| | | | | 709/201 |
| 8,412,813 | B2* | 4/2013 | Carlson | G06F 8/36 |
| | | | | 707/610 |
| 8,555,161 | B2 | 10/2013 | Parker | |
| 8,595,620 | B2* | 11/2013 | Larsen | G06F 19/322 |
| | | | | 715/254 |
| 8,656,290 | B1 | 2/2014 | Greenspan et al. | |
| 8,825,594 | B2* | 9/2014 | Skaria | G06Q 10/10 |
| | | | | 707/608 |
| 9,015,301 | B2* | 4/2015 | Redlich | G06Q 10/10 |
| | | | | 707/609 |
| 9,152,686 | B2* | 10/2015 | Whitehead | G06F 11/00 |
| 2002/0049697 | A1* | 4/2002 | Nakano | G06F 8/20 |
| 2002/0065848 | A1* | 5/2002 | Walker | G06F 17/24 |
| | | | | 715/205 |
| 2003/0121008 | A1* | 6/2003 | Tischer | G06F 17/2247 |
| | | | | 715/255 |
| 2004/0024752 | A1* | 2/2004 | Manber | G06F 17/30675 |
| 2005/0132070 | A1* | 6/2005 | Redlich | G06F 21/6209 |
| | | | | 709/228 |
| 2006/0271868 | A1* | 11/2006 | Sullivan | G06F 17/2288 |
| | | | | 715/764 |
| 2007/0186157 | A1* | 8/2007 | Walker | G06F 17/24 |
| | | | | 715/234 |
| 2007/0245409 | A1* | 10/2007 | Harris | H04L 63/0272 |
| | | | | 726/5 |
| 2008/0005164 | A1* | 1/2008 | Yee | G06F 17/3089 |
| 2008/0114720 | A1* | 5/2008 | Smith | G06F 17/30578 |
| 2008/0177825 | A1* | 7/2008 | Dubinko | G06F 17/217 |
| | | | | 709/203 |
| 2012/0030563 | A1 | 2/2012 | Lemonik et al. | |
| 2012/0173612 | A1* | 7/2012 | Vegesna-Venkata | G06F 17/24 |
| | | | | 709/203 |
| 2014/0047327 | A1* | 2/2014 | Larsen | G06F 19/322 |
| | | | | 715/255 |
| 2014/0181016 | A1 | 6/2014 | Whitehead et al. | |
| 2014/0245257 | A1* | 8/2014 | Kusmer | G06F 8/34 |
| | | | | 717/113 |
| 2015/0058449 | A1* | 2/2015 | Garg | H04L 67/10 |
| | | | | 709/219 |

OTHER PUBLICATIONS

Grishchenko et al., "Referencing within evolving hypertext," Second international Workshop on Dynamic and Adaptive Hypertext, 2011, 12 pages.

Ignat et al., "Tree-based model algorithm for maintaining consistency in real-time collaborative editing systems," The Fourth International Workshop on Collaborative Editing Systems, CSCW 2002, New Orleans, USA, Nov. 2002, 8 pages.

* cited by examiner

US 9,292,482 B1

SYSTEM AND METHOD FOR CONVERGENT DOCUMENT COLLABORATION

CROSS-REFERENCE TO RELATED APPLICATION

This application claims the benefit of U.S. Provisional Patent Application No. 62/155,000, entitled "SYSTEM AND METHOD FOR CONVERGENT DOCUMENT COLLABORATION," filed on Apr. 30, 2015, the disclosure of which is incorporated herein by reference in its entirety.

BACKGROUND

1. Field

Embodiments disclosed herein generally relate to a system and method for document collaboration, and more specifically to a system and method for efficiently tracking and storing changes made collaboratively in documents.

2. Related Art

Collaborative editing applications allow multiple users to access and edit a document. There are two conventional approaches to collaboration on documents. The first approach uses an application to manage requests to edit a document by checking a document in and out of shared storage, permitting only one user at a time to edit the document.

The second conventional collaborative approach has the master document's owner create a unique copy of that document for each collaborator. Because the collaborators are denied knowledge of others' edits, their respective work quickly results in conflicting changes to the master document. The master document's owner is left with resolving these conflicts. What was to be collaboration diverges into a conflict of edits.

SUMMARY

A system and method based on convergence solves the problems caused by the divergence arising from conventional simultaneous document collaboration methods. It ensures that all users always are working with the same document. This does work with a single user, too, but simultaneous editing is the more difficult situation.

In an embodiment, a method is implemented on a server. The method includes storing, on a database of the server, a causal tree structure corresponding to a document, where the causal tree structure includes a sequence of editing instructions and each editing instruction is assigned an identifier unique to such editing instruction. The method also includes receiving, at the server, a user editing instruction for the document, where the user editing instruction is assigned an identifier unique to the user editing instruction. The method further includes storing, using a processor of the server, the user editing instruction and the identifier assigned to the user editing instruction as an additional node to the causal tree structure. The method includes broadcasting, to a plurality of client devices connected to the server, the user editing instruction and the identifier assigned to the user editing instruction.

The identifier assigned to the user editing instruction may include a site identifier unique to an editing session of the user, and a stamp, where the stamp is a numeric value based on identifiers assigned to editing instructions in the causal tree structure.

The identifier assigned to the user editing instruction may further include a cause identifier, where the cause identifier is an identifier of a prior editing instruction in a node in the causal tree structure that precedes the additional node.

The document may be composed by traversing identifiers of the editing instructions in a sequential order.

The user editing instruction may include an instruction to modify a series of consecutive data in the document.

Each editing instruction in the causal tree structure may include at least one instruction selected from the group consisting of a modification of a value, a modification of metadata, a link to another node of the causal tree structure, a link to a node in another causal tree structure corresponding to another document, a link to the other causal tree, and a link to data residing outside the causal tree structure.

The causal tree structure may include an editing instruction that is assigned a cause identifier, where the cause identifier is an identifier of a prior editing instruction in the causal tree structure that precedes the editing instruction.

The causal tree structure may further include a second editing instruction that is assigned the same cause identifier as the editing instruction, and the editing instruction and the second editing instruction may form separate branches of the causal tree structure.

In another embodiment, a method is implemented on a client device. The method includes receiving, from a server connected to the client device, at least a portion of a causal tree structure corresponding to a document, where the causal tree structure is stored on the server and includes a sequence of editing instructions and each editing instruction is assigned an identifier unique to such editing instruction. The method includes storing the portion of the causal tree structure. The method further includes receiving a user editing instruction for the document, and assigning, using a processor of the client device, an identifier to the user editing instruction. The method includes transmitting, to the server, the user editing instruction and the identifier assigned to the user editing instruction. The method also includes receiving, from the server, another user editing instruction for the document and an identifier assigned to the other user editing instruction. The method includes storing the user editing instruction and the identifier assigned to the user instruction, and the received other user editing instruction and the received identifier as additional nodes to the portion of the causal tree structure. The method then includes rendering the user editing instruction and the received other user instruction.

Assigning the identifier to the user editing instruction may include assigning a site identifier unique to the user's editing session on the client device, and assigning a stamp, where the stamp a numeric value based on identifiers assigned to editing instructions in the causal tree structure stored on the server.

Assigning the identifier to the user editing instruction may further include assigning a cause identifier, where the cause identifier is an identifier of a prior editing instruction in the causal tree structure that precedes the additional node.

The method may further include composing the document by traversing identifiers of the editing instructions in the portion of the causal tree structure in a sequential order.

The user editing instruction may include an instruction to modify a series of consecutive data in the document.

Each editing instruction in the causal tree structure may include at least one instruction selected from the group consisting of a modification of a value, a modification of metadata, a link to another node of the causal tree structure, a link to a node in another causal tree structure corresponding to another document, a link to the other causal tree structure, and a link to data residing outside the causal tree structure.

The user editing instruction and the other user editing instruction may share a cause identifier, where the cause identifier is an identifier of a prior editing instruction in the causal tree structure that precedes both the user editing instruction and the other user editing instruction.

The method may further include receiving a next user editing instruction, and assigning an identifier to the next user editing instruction based on the identifier assigned to the user instruction and the identifier assigned to the other user instruction.

In yet another embodiment, a method is implemented on a server. The method includes storing, on a database of the server, a causal tree structure corresponding to a document, where the causal tree structure includes a sequence of editing instructions and each editing instruction is assigned an identifier unique to such editing instruction. The method includes receiving, at the server, a first user editing instruction transmitted by a first client device and a second user editing instruction transmitted by a second client device, where the first user editing instruction is assigned a first identifier and the second user editing instruction is assigned a second identifier. The method further includes storing the first user editing instruction and the first identifier as a first additional node to the causal tree structure, and storing the second user editing instruction and the second identifier as a second additional node to the causal tree structure. The method includes transmitting, to the first client device, the second user editing instruction and the second identifier, to render changes to the document corresponding to the first user editing instruction and the second user editing instruction. The method further includes transmitting, to the second client device, the first user editing instruction and the first identifier, to render changes to the document corresponding to the first user editing instruction and the second user editing instruction.

The first identifier may include a first site identifier unique to a first user's editing session on the first client device, and a first stamp, which is a numeric value based on identifiers assigned to editing instructions in the causal tree structure. The second identifier may include a second site identifier unique to a second user's editing session on the second client device, and a second stamp, which is a numeric value based on identifiers assigned to editing instructions in the causal tree structure.

The first identifier may further include a first cause identifier, which is an identifier of a prior editing instruction in the causal tree structure that precedes the first user editing instruction. The second identifier may further include a second cause identifier, which is an identifier of a prior editing instruction in the causal tree structure that precedes the second user editing instruction.

When the first cause identifier and the second cause identifier are the same, and the method further includes comparing the first stamp and the second stamp. If the first stamp is greater than the second stamp, the method includes processing the first user editing instruction before processing the second user editing instruction. If the first stamp is less than the second stamp, the method includes processing the second user editing instruction before processing the first user editing instruction.

When the first user editing instruction and the second user editing instruction are received simultaneously, and the method further includes comparing the first site identifier and the second site identifier. If the first site identifier is less than the second site identifier, the method includes processing the first user editing instruction before processing the second user editing instruction. If the first site identifier is greater than the second site identifier, the method includes processing the second user editing instruction before processing the second user editing instruction.

The first identifier may include a first time stamp and the second identifier may include a second time stamp. The method may include comparing the first time stamp and the second time stamp. If the first time stamp has an earlier time than the second time stamp, the method includes processing the first user editing instruction before processing the second user editing instruction. If the first time stamp has a later time than the second time stamp, the method includes processing the second user editing instruction before processing the first user editing instruction.

Each editing instruction in the causal tree structure includes at least one instruction selected from the group consisting of a modification of a value, a modification of metadata, a link to another node of the causal tree structure, a link to a node in another causal tree structure corresponding to another document, a link to the other causal tree structure, and a link to data residing outside the causal tree structure.

In yet another embodiment, a method is implemented on a server. The method includes storing, on a database of the server, a causal tree structure corresponding to a document, where the causal tree structure includes a sequence of editing instructions and each editing instruction is assigned an identifier unique to such editing instruction. The method further includes dividing, using a processor on the server, the causal tree structure into a plurality of branches, where each branch has about the same number of editing instructions. The method includes receiving a user editing instruction for the document, where the user editing instruction is assigned an identifier unique to the user editing instruction, and storing the user editing instruction and the identifier assigned to the user editing instruction as an additional node to a first branch of the causal tree structure. The method further includes broadcasting, to a plurality of client devices connected to the server, the user editing instruction and the identifier assigned to the user editing instruction.

The method may further include comparing a number of editing instructions in the first branch of the causal tree structure to a predetermined number. If the number of editing instructions in the first branch exceed the predetermined number, re-dividing the causal tree structure into a second plurality of branches having about the same number of editing instructions.

The causal tree structure may be re-divided when all user sessions to edit the document are terminated.

The method may include temporarily suspending all user sessions to edit the document when re-dividing the causal tree structure.

The re-divided causal tree structure may have a different number of branches than the causal tree structure.

The identifier assigned to each editing instruction may include an instruction identifier and a cause identifier.

Re-dividing the causal tree structure may include modifying cause identifiers of first editing instructions in the second plurality of branches without modifying the instruction identifiers of the first editing instructions.

BRIEF DESCRIPTION OF THE DRAWINGS

The features and advantages of the invention will become more apparent by describing in detail exemplary embodiments thereof with reference to the attached drawings, in which.

DETAILED DESCRIPTION

As described herein, various embodiments relate to a system and method for efficiently tracking and storing changes made in documents. In an embodiment, the system and method are used to track and store changes made in editable documents, including but not limited to spreadsheets, content in presentations, graphic components in flow charts and diagrams. The system and method are also used to track and store changes made in a document by multiple users.

A document collaboration system may include a server and various client devices or may simply involve a single device or peer-to-peer devices. The document collaboration system may be implemented in a cloud computing environment. In a client-server architecture, a document collaboration editing application may be installed on the server, the client devices, or both. The document collaboration editing application may also be an application that is accessible through a web browser.

Figure 1A:
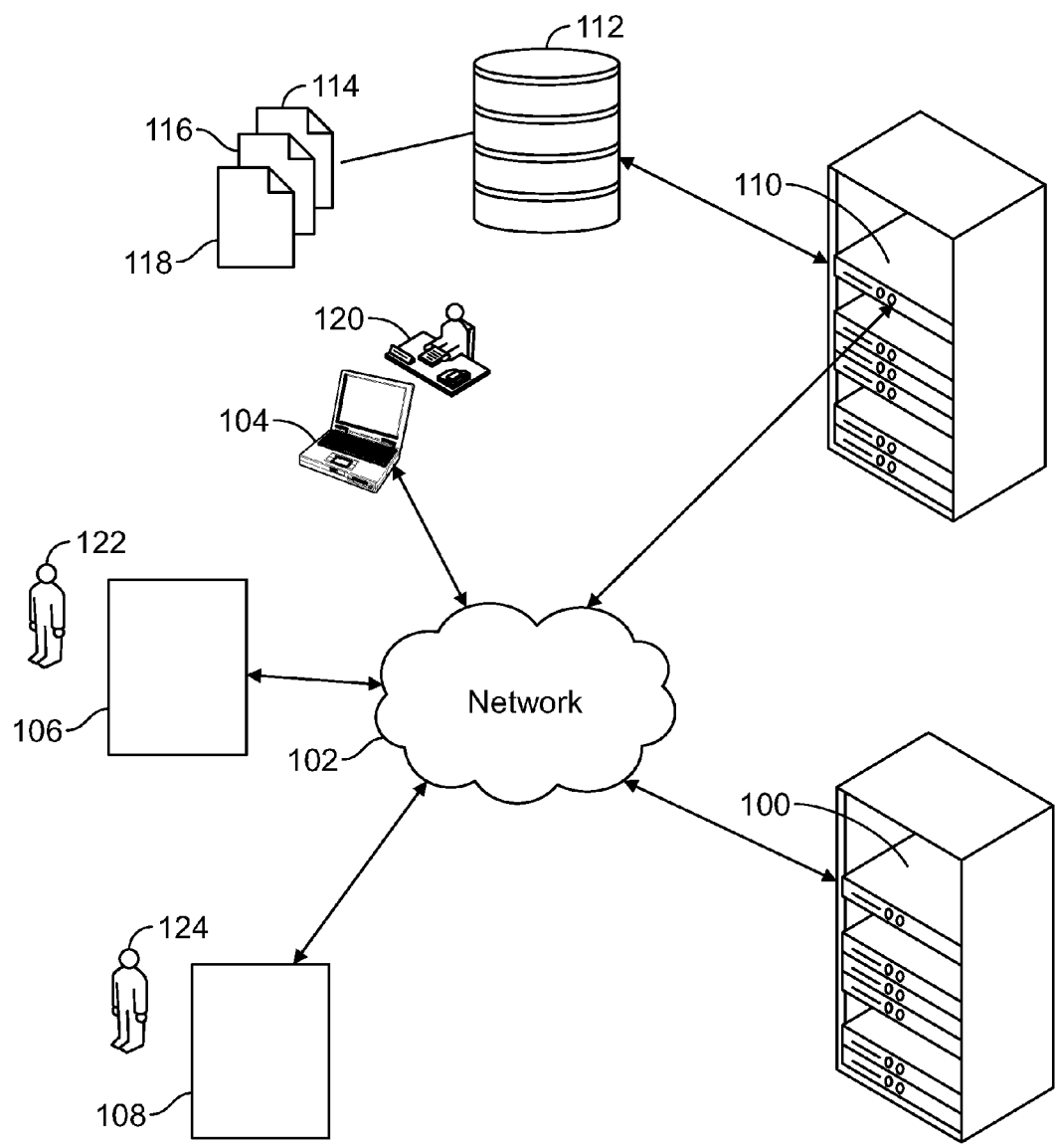
FIG. 1A is an example of a networking environment in which various embodiments of the disclosure may be employed.

Various embodiments of the disclosure are implemented in a computer networking environment. Turning to FIG. 1A, an example of such an environment is shown. A first computing device 100 is communicatively linked to a network 102. Possible implementations of the network 102 include a local-area network, a wide-area network, a private network, a public network (e.g., the Internet), or any combination of these. The network 102 may include both wired and wireless components. Also communicatively linked to the network 102 are a second computing device 104, a third computing device 106, a fourth computing device 108, and a fifth computing device 110. The fifth computing device 110 is communicatively linked to a media storage device 112 (e.g., a redundant array of independent disks). For the sake of example, it is assumed that a first user 120 operates the second computing device 104, a second user 122 operates the third computing device 106, and a third user 124 operates the fourth computing device 108.

Residing within the media storage device 112 are multiple documents, three of which are depicted in FIG. 1A: a first document 114, a second document 116, and a third document 118. The first computing device 100 and the fifth computing device 110 are depicted as rack-mounted servers, the second computing device 104 is depicted as a notebook computer, and the third and fourth computing devices 106 and 108 are depicted as tablet computers. However, the computing devices depicted in FIG. 1A are merely representative. Other possible implementations of a computing device include a desktop computer and a smartphone. Furthermore, although the first, second, and third documents 114, 116, and 118 are depicted as being stored in a single device, they may, in fact, be stored on multiple storage devices (e.g., sharded into multiple physical chunks) of a cloud storage service. Finally, there may be more than or fewer than the first, second, and third documents 114, 116, and 118 residing on the media storage device 112.

For convenient reference, the first computing device 100 will also be referred to as a "productivity server 100" and the fifth computing device 110 will be also be referred to as a "database server 110." Although depicted in FIG. 1A as separate devices, in some embodiments, the functionality of the productivity server 100 and the database server 110 are on the same device. The productivity server 100 executes one or more productivity programs. Under the control of the one or more productivity programs, the productivity server 100 interacts with the database server 110 and the computing devices 104, 106, and 108 (e.g., client devices 104, 106, and 108) to allow the computing devices to access the first document 114, the second document 116, and the third document 118 so that the first user 120, the second user 122, and the third user 124 can collaborate in commenting on or editing the documents.

Figure 1B:
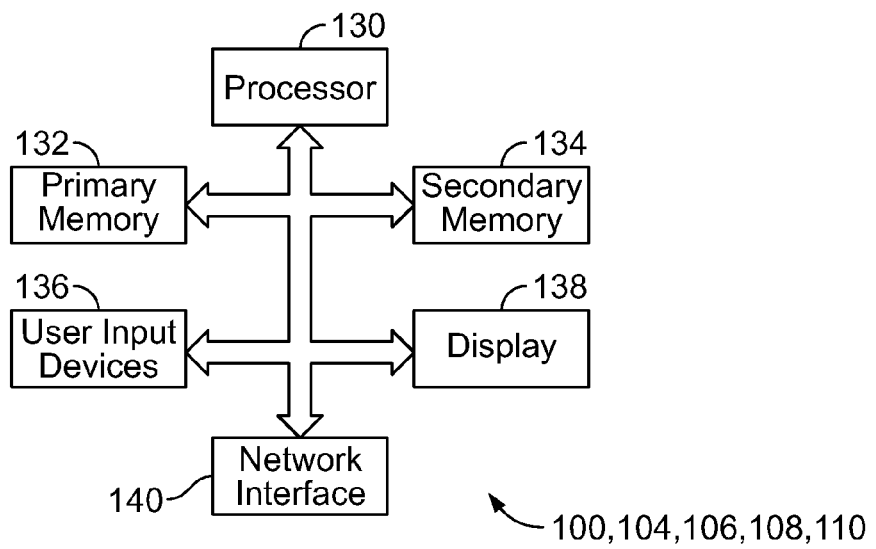
FIG. 1B is a block diagram of a computing device according to an embodiment.

In one implementation, one or more of the computing devices of FIG. 1A have the general architecture shown in FIG. 1B. The device depicted in FIG. 1B includes a processor 130 (e.g., a microprocessor, controller, or application-specific integrated circuit), a primary memory 132 (e.g., volatile memory, random-access memory), a secondary memory 134 (e.g., non-volatile memory), user input devices 136 (e.g., a keyboard, mouse, or touchscreen), a display 138 (e.g., an organic, light-emitting diode display), and a network interface 140 (which may be wired or wireless). The memories 132 and 134 store instructions and data. The processor 130 executes the instructions and uses the data to carry out various procedures including, in some embodiments, the methods described herein.

The computing devices of FIG. 1A (i.e., the processor 130 of each of the computing devices) are able to communicate with other devices of FIG. 1A via the network interface 140 over the network 102. In an embodiment, this communication takes place via a user interface that the productivity server 100 provides to the computing devices 104, 106, and 108. The specific nature of the user interface and what the user interface shows at any given time may vary depending what the user has chosen to view. Also, multiple users may interact different instances of the user interface on different devices.

Causal tree structures are useful representations of how content and metadata associated with the content are organized. For example, a document may be represented by a single causal tree structure or a bounded set of causal tree structures. The causal tree structure is useful in efficiently tracking and storing changes made in the document. A typical causal tree structure includes nodes of the editing instructions in the document, and each editing instruction has a unique identifier or ID. The editing instructions include, for example, text characters, insertion of text characters, deletion of text characters, formatting instructions, copy and paste, cut and paste, etc. In other words, a causal tree structure is a representation of all the instructions (regardless of type) that compose a document. The causal tree structure starts with a root node, from which all other instruction nodes branch. Except for the root node, each editing instruction in the document is caused by whichever editing instruction that came before it. Every editing instruction is aware of the ID of its parent instruction, i.e., the instruction that "caused" it. In an embodiment, each instruction (other than the root node) in the document may be represented as a 3-tuple: ID (ID of the instruction), CauseID (ID of the parent instruction), and Value (value of the instruction). Example causal tree structures are shown in FIG. 2A and FIG. 2B.

Figure 2A:
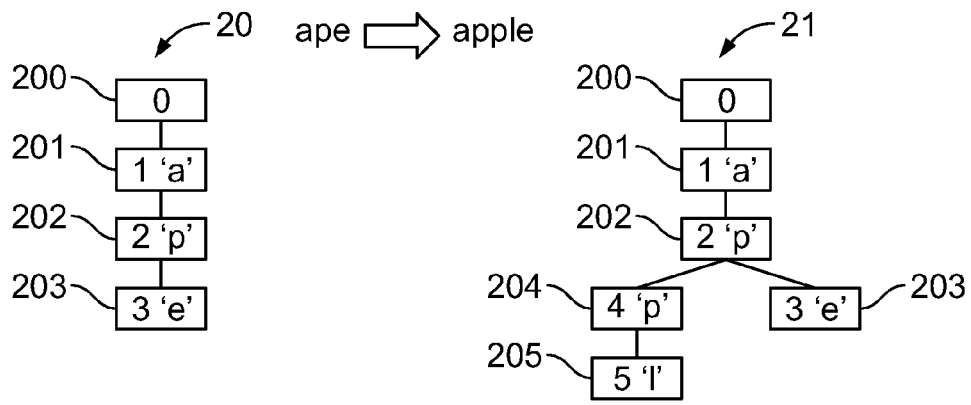
FIG. 2A is a diagram illustrating insertion of text in a causal tree structure.
Figure 2B:
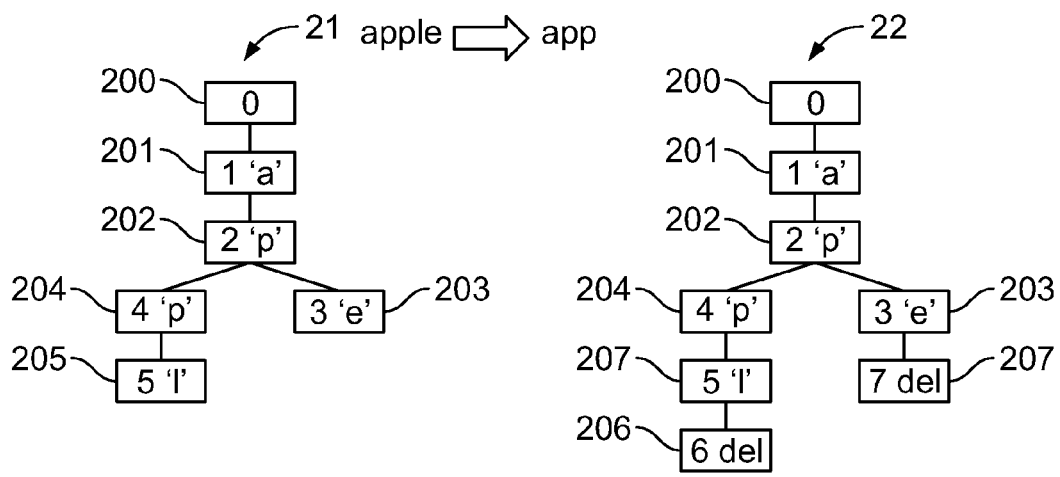
FIG. 2B is a diagram illustrating deletion of text in a causal tree structure.

FIG. 2A is a diagram illustrating insertion of text in a causal tree structure. A causal tree 20 for the text "ape" is shown. The first node in the causal tree 20 is the root node 200, assigned an ID of "0". Following the root node 200 is the character "a", which resides in a first node 201 having an ID of "1", a CauseID of "0", and a Value of "a". Following the character "a", character "p" is located in a second node 202 having has an ID of "2", a CauseID of "1", and a Value of "p". Finally, character "e" follows the character "p" and resides in a third node 203, which has an ID of "3", a CauseID of "2", and a Value of "e". Together, root node 200 to the third node 203 forms one branch of the causal tree 20.

When a user changes the text "ape" to "apple" by inserting new characters "p" and "1" between the existing characters "p" and "e" in the causal tree 20, these insertions result in causal tree 21. The causal tree 21 is a modified version of the causal tree 20 and tracks the character insertion instructions as additional nodes of the tree. In the causal tree 21, the instruction to insert a new character "p" is added as the fourth node 204 and is assigned the next available ID, i.e., "4". The instruction to insert new character "p" also has a CauseID of "3" since its parent instruction is the existing "p" in the text "ape". The instruction to insert a new character "1" follows the instruction to insert the new character "p", and the instruction to insert the new character "1" is shown in a fifth node 205. The instruction to insert the new character "1" has an ID of "5", a CauseID of "4", and a value of "1".

As shown in FIG. 2A, two branches are formed or caused by the second node 202 (the first "p"). The first branch includes the third node 203, which is the character "e" from the text "ape". The second branch includes the fourth node 204 (the second "p") and the fifth node 205 (the character "1"). In an embodiment, the ordering of branches in a causal tree is significant because incorrectly sequenced branches result in unwanted results. For example, an incorrectly sequenced branch from the second node 202 in causal tree 21 would result in "apepl" rather than "apple".

In an embodiment, sequence of the instructions in a causal tree is determined by the ID of the instructions; the higher the value of the ID the later the node came into existence, since the ID for a node is based on the next available sequential ID in the document. For example, in causal tree 21 the fourth node 204 has the ID of "4" and thus was created after the third node 203 which has the ID of "3". Nodes or branches sharing the same CauseID are ordered from highest value ID to lowest value ID. For example, in causal tree 21, the fourth node 204 and the third node 203 share the same parent node (the second node 202) and the same CauseID of "2". Because the ID ("4") of the fourth node 204 is higher than the ID ("3") of the third node 203, the fourth node 204 begins the first branch following the second node 202, and the third node 203 begins the second branch following the second node 202. In yet another embodiment, sequence of the branches is determined by a time stamp, where the nodes sharing the same CauseID are ordered from newest node (i.e., created later in time) to oldest node (i.e., created earlier in time).

FIG. 2B illustrates deletion of text from a causal tree structure. When a user deletes a character from existing text, the character is not removed from the causal tree structure, but only marked as deleted. In other words, the causal tree tracks the instructions to delete using additional nodes. For example, the user changes the text "apple" to "app" by deleting the characters "1" and "e", corresponding to the fifth node 205 and the third node 203, from the causal tree 21. The deletion of the character results in the modified causal tree 22. In the causal tree 22, a "del" instruction (i.e., delete instruction) is created after the characters "1" (fifth node 205) and "e" (third node 203). The "del" instruction in the sixth node 206 is caused by the character "1" and is assigned the next available ID, which is "6". Because the "del" instruction in the sixth node 206 is caused by the character "1", it has a CauseID of "5" corresponding to the ID of the character "1". The "del" instruction in the seventh node 207 is caused by the character "e" and has an ID of "7". The "del" instruction in the seventh node 207 has a CauseID of "3", which corresponds to the ID of the character "e". The Value of the "del" instruction is "del", which represents deletion.

Using a causal tree structure, every editing instruction in a document is immutable (including deletions), which ensures convergence of the changes at all user sites. As long as sufficient time is allowed for all editing instructions to arrive at all user sites, every user device will be able to construct the same causal tree and the users will be able to view and edit the same revision of document. In an embodiment, the value of the editing instruction may be mutable, however, the ID (e.g., ID of the node containing the editing instruction) is not mutable.

Storing the 3-tuple of every editing instruction in a document, however, requires a lot of memory and network transmission time. To reduce the amount of storage space and network transmission time needed, causal trees are compressed, where tree nodes form long chains with incrementing IDs. Not every ID is stored; only the first ID in each chain is stored. The CauseID may be similarly compressed.

Figure 3:
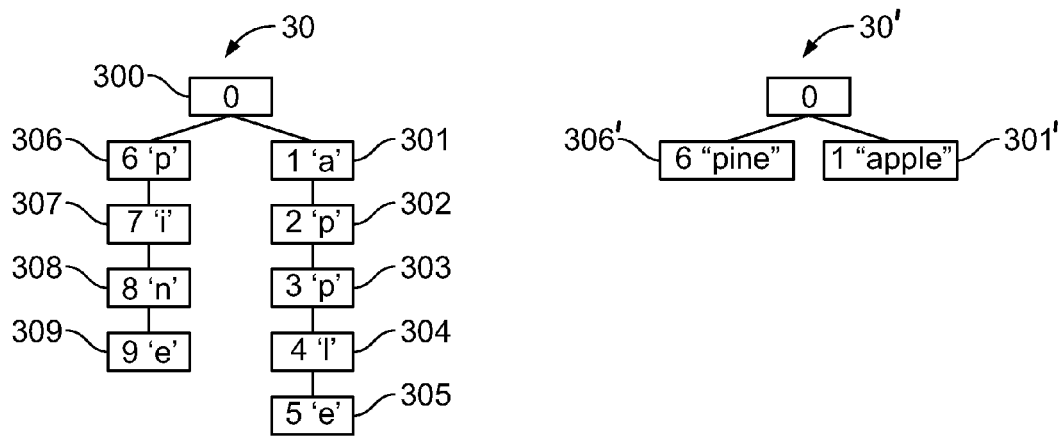
FIG. 3 is a diagram illustrating a compression algorithm for insertion of text in a causal tree structure, according to an embodiment.

FIG. 3 is a diagram illustrating a compression algorithm for insertion of text in a causal tree, according to an embodiment. In an example, a user inserts "pine" before "apple" to create the text "pineapple". The insertion of text generates an uncompressed causal tree 30, in which four additional characters with IDs of "6", "7", "8", and "9" are generated. In more detail, the causal tree 300 includes a root node 300, which causes two branches. The first branch includes nodes 301, 302, 303, 304, and 305, which respectively correspond to the IDs of "1" to "5" forming the text "apple". The second branch includes nodes 306, 307, 308, and 309, which respectively correspond to the IDs of "6" to "9" forming the text "pine".

A compression algorithm is applied to uncompressed causal tree 30 resulting in compressed causal tree 30'. In compressed tree 30', node 301 to 305 with IDs of "1" to "5" are grouped or chained together to form a chain node 301' for the text "apple". Nodes 306 to 309 with IDs of "6" to "9" are grouped or chained together to form another chain node 306' for the text "pine". In an embodiment, in the compressed causal tree 30', only the ID of the first node in a chain node is stored. In FIG. 3, for chain node 301', only the ID of the first character "a" is stored; for chain node 306', only the ID of the first character "p" is stored. Consequently, in the compressed causal tree 30', instead of storing IDs "1" to "9" as in uncompressed causal tree 30, the only IDs stored are "1" and "6".

Figure 4:
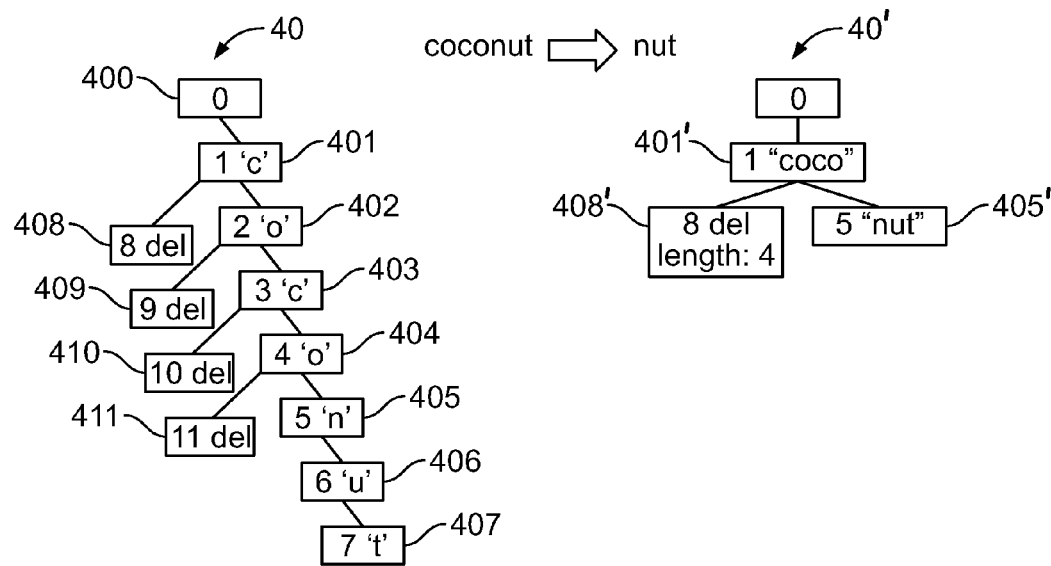
FIG. 4 is a diagram illustrating a compression algorithm for deletion of text in a causal tree structure, according to an embodiment.

FIG. 4 is a diagram illustrating a compression algorithm for deletion of text in a causal tree structure, according to an embodiment. In an example, a user deletes "coco" from "coconut" to create the text "nut". Uncompressed causal tree 40 includes a root node 400 and nodes 401 to 411. Nodes 401 to 407 respectively correspond to the characters in the text "coconut", which has IDs of "1" to "7". Since "coco" is deleted from "coconut", a "del" instruction is added after each character of "coco", resulting in four deletion instructions "del" having IDs of "8", "9", "10", and "11". The four deletion instructions "del" reside in nodes 408 to 411.

A compression algorithm is applied to uncompressed causal tree 40 resulting in compressed causal tree 40'. The compressed causal tree 40' includes the root node 400. Following the root node 400 is a chain node 401' for the text "coco". The chain node 401' has an ID of "1" (the ID of the first character "c") and a CauseID of "0" (the ID of the root node 400). The chain node 401' in turn causes two chain nodes 405' and 408'. The chain node 405' has an ID of "5", a CauseID of "1", and a Value of "nut". The chain node 408' has an ID of "8", a Cause ID of "1", and a Value of "del" representing the deletion instruction. In an embodiment, the chain node 408' includes a length field ("4"), because the chain node 408' contains four deletion instructions "del". Instead of removing the text "coco" from the tree, the chain node 408' modifies the character chain node 401' so that the system tracks the edit that deleted "coco" from "coconut".

In compressed causal tree 40', only three IDs are stored following the root node 400. ID "1" is stored and corresponds to "coco" in chain node 401'. ID "5" is stored and corresponds to "nut" in chain node 405'. ID "8" is stored and correspond to the four deletion instructions "del" in chain node 408'. The chain nodes 405' and 408' share the same CauseID of "1", because "coco" of chain node 401' is the parent of both chain nodes 405' and 408'.

Figure 5A:
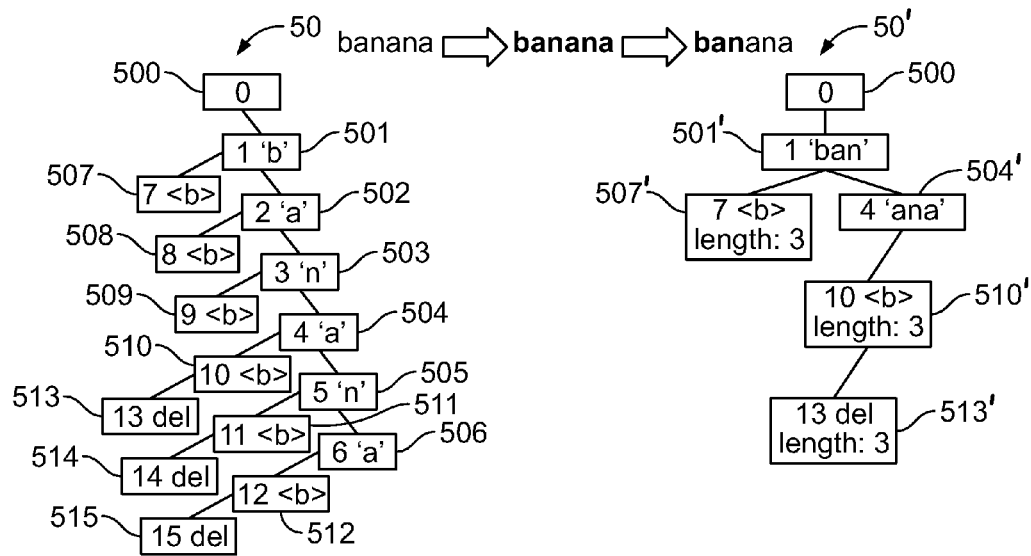
FIG. 5A is a diagram illustrating a compression algorithm for formatting changes in a causal tree structure, according to an embodiment.

Not only can the causal tree structure be used to track and store insertion and deletion of text, it can also be utilized to track and store formatting changes and other metadata changes. FIG. 5A is a diagram illustrating a compression algorithm for tracking and storing formatting changes in a causal tree structure, according to an embodiment. A user first bolds the text "banana" and then enters an instruction to delete the bolding of the characters "ana". As a result, the "ban" portion of the text "banana" is displayed in bold while the "ono" portion of the text "banana" is displayed not in bold.

Uncompressed causal tree 50 includes a root node 500 and nodes 501 to 515. Nodes 501 to 506 respectively correspond to the characters in the text "banana", which has IDs of "1" to "6". When the text "banana" is bolded, a bold instruction "<b>" is generated for each character node in the text "banana". In uncompressed causal tree 50, the bold instructions "<b>" span nodes 507 to 512 and have IDs "7" to "12". Each of the bold instructions "<b>" at character nodes 507 to 512 is caused by a character in the text "banana". For example, the bold instruction "<b>" at node 507 is caused by the character "b" at node 501. The bold instruction "<b>" at node 507 thus has a CauseID of "1". Likewise, the bold instruction "<b>" at node 512 is caused by the last "a" at node 506. The bold instruction "<b>" at node 512 thus has a CauseID of "6".

When the user enters an instruction to delete the bolding of the "ana" portion of the text "banana", three deletion instructions "del" are generated and added to the uncompressed causal tree 50. The deletion instructions "del" have IDs of "13", "14", and "15" and are caused by nodes 510, 511, and 512, respectively, and thus have respective CauseIDs of "10", "11", and "12". A deletion instruction does not remove the characters or instructions from the causal tree; instead, the deletion instruction simply instructs for the deletion or undoing of its respective parent node. In this example, the bold instructions "<b>" at nodes 510, 511, and 512 remain pointing to their respective parent nodes, i.e., nodes 504, 505, and 506, even though the bold instructions "<b>" at nodes 510, 511, and 512 are marked as deleted by the delete instructions "del" at nodes 513, 514, and 515.

When uncompressed causal tree 50 is compressed, the result is the compressed causal tree 50'. The compressed causal tree 50' includes the root node 500. Following the root node 500 is a chain node 501' for the text "ban". The chain node 501' has an ID of "1" (the ID of the first character "b") and a CauseID of "0" (the ID of the root node 500). The chain node 501' in turn causes two chain nodes 504' and 507'. The chain node 507' is a formatting chain node and has an ID of "7", a CauseID of "1", and a Value of "<b>" representing a bold instruction. In an embodiment, a length field is included in formatting chain node 507' to indicate that the chain is "3" characters long, i.e., there are three bold instructions "<b>" in the formatting chain node 507'. In other embodiments, however, the length field is omitted from the formatting chain node 507'. The three bold instructions "<b>" in formatting chain node 507' are caused by the text "ban" in chain node 501', and the bold instructions "<b>" modify the text "ban" to create the bolded word "ban".

The chain node 501' also causes the chain node 504', which has an ID of "4", a CauseID of "1", and a Value of "ana". The chain node 504' in turn causes another formatting chain node 510', which has an ID of "10", a CauseID of "4", and a Value of "<b>" representing a bold instruction. A length field in formatting chain node 510' indicates that the chain is "3" characters long, i.e., there are three bold instructions "<b>" in the formatting chain node 510'. The bold instructions "<b>" in the formatting chain node 510' modify the text "ana" in the chain node 504'.

When the user enters the instruction to delete the bolding of the characters "ana", the formatting chain node 510' causes a chain node 513'. The chain node 513' includes deletion instructions "del" and has an ID of "13", a CauseID of "10", and a Value of "del" representing a delete instruction. A length field in the chain node 513' indicates that the chain is "3" characters long, i.e., there are three deletion instructions "del" in the chain node. The deletion instructions in the chain node 513' modify the formatting chain node 510', i.e., which deletes the bold instructions contained in chain node 510'.

The user experience to unbold the text "ana" may be represented in another syntax, in another embodiment. In one example, it could be a syntax representing bold-ness as a Boolean property e.g., "bold=false". In another example, it could be a syntax where the unbold is a complementary instruction to "<b>" i.e., "<unb>".

Figure 5B:
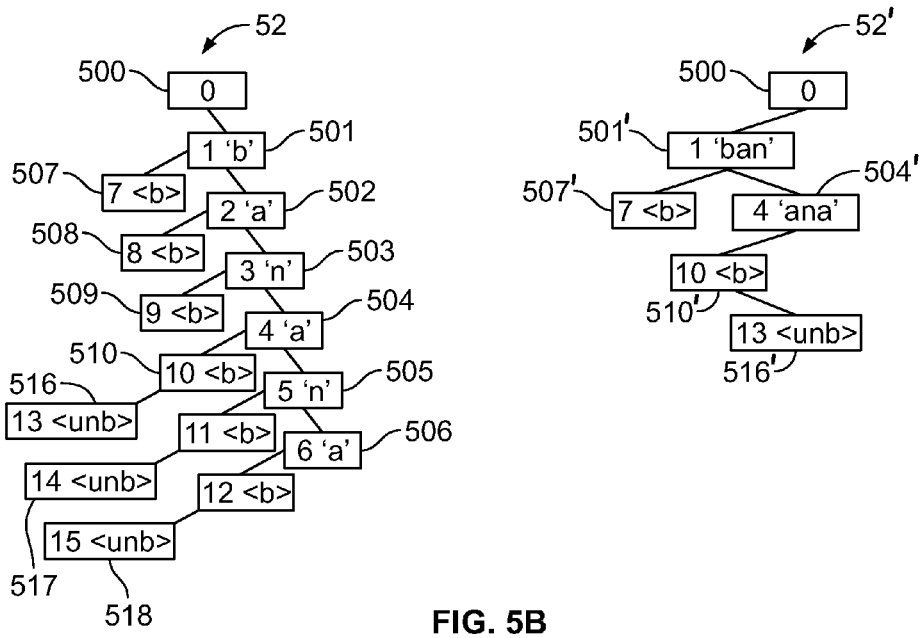
FIG. 5B is a diagram illustrating a compression algorithm for tracking and storing formatting changes in a causal tree structure, according to an embodiment.

FIG. 5B is a diagram illustrating one possible alternate approach to handling formatting change instructions, and then the application of the compression algorithm for tracking and storing formatting changes in a causal tree structure, according to an embodiment. A user first bolds the text "banana" and then enters an "unbold" instruction to unbold "ana". As a result, the "ban" portion of the text "banana" is displayed in bold while the "ana" portion of the text "banana" is displayed not in bold, which is the same result as shown in FIG. 5A. FIG. 5B illustrate some of the same elements as FIG. 5A and the description of such like-numbered elements are omitted for brevity.

As shown in FIG. 5B, in uncompressed causal tree 52, when the user enters an "unbold" instruction to unbold the text "ana", three nodes 516, 517, and 518 are created. Node 516 has an ID of "13", a CauseID of "10", and a Value of "<unb>" representing an unbold instruction. Node 517 has an ID of "14", a CauseID of "11", and a Value of "<unb>". Node 518 has an ID of "15", a CauseID of "12", and a Value of "<unb>." Thus, the nodes 516, 517 and 518 corresponding to the unbold instruction are caused by the nodes 510, 511, and 512 corresponding to the bold instructions "<b>" of the text "ana." On the other hand, in the uncompressed tree 50 of FIG. 5A, the delete "<del>" instruction adds deletion instruction nodes 513, 514, and 515 to the bold instruction nodes 510, 511, and 512. The result of both causal trees 50 and 52 are the same, which is that "ana" is bolded and then unbolded.

Compressing uncompressed causal tree 52 results in compressed causal tree 52'. When the user enters the "unbold" instruction to unbold the text "ana", the chain node 510' causes a chain node 516'. The chain node 516' includes unbold instructions "<unb>" and has an ID of "13", a CauseID of "10", and a Value of "<unb>" representing an unbold instruction. The instructions in the chain node 516' modify the chain node 510', i.e., which unbolds the text "ana" (chain node 504') that was previously bolded by chain node 510'.

Furthermore, although delete instruction (from the perspective of the system) or an undo instruction (from the perspective of the user) is applied to a bold instruction in FIG. 5A, the process is similar when the undo instruction is applied to other types of instructions (e.g., insertion of text, deletion of text, copy and paste instruction, etc.). As an example, if the bolded word "ana" (which encompasses chain nodes 504' and 510') are deleted, and the delete instruction is undone, both chain nodes 504' and 510' would be re-displayed at the user device. In general terms, any instruction can be undone by attaching a deletion instruction to it (e.g., a deletion instruction may be attached to another deletion instruction to undo the previous deletion).

Figure 6:
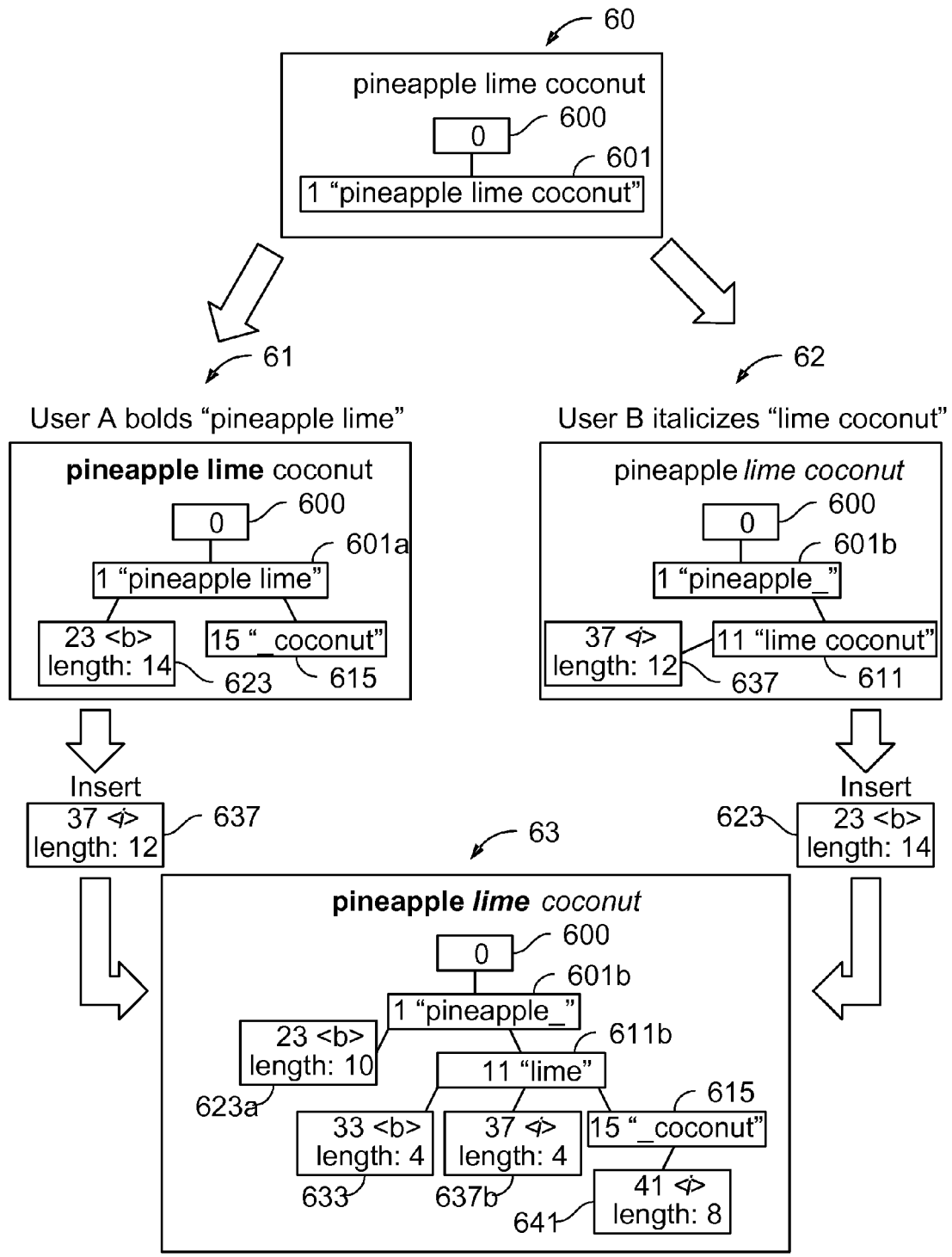
FIG. 6 is a diagram illustrating a compression algorithm for resolving formatting conflicts in a causal tree structure, according to an embodiment.

FIG. 6 is a diagram illustrating a compression algorithm for resolving formatting conflicts in a causal tree structure, according to an embodiment. When multiple users edit the same document, formatting conflicts may occur. Such conflicts may be resolved using a causal tree structure according to an embodiment.

In FIG. 6, a document includes the text "pineapple lime coconut". The document is represented by a causal tree 60, which includes a root node 600 and a chain node 601. The chain node 601 has an ID of "1", a CauseID of "0", and a Value of "pineapple lime coconut". Two users, User A and User B, make changes to the document. User A accesses and edits the document from a first user site and/or client device. User B accesses and edits the document from a second user site and/or client device.

User A bolds "pineapple lime", resulting in causal tree 61 based on User A's edits. The causal tree 61 includes the root node 600 and chain nodes 601a, 615, and 623. Chain node 601a is a character chain node and has an ID of "1", a CauseID of "0", and a Value of "pineapple lime". Character chain node 601a in turn causes chain nodes 615 and 623. Chain node 615 is also a character chain node and has an ID of "15", a CauseID of "1", and a Value of "_coconut" (a space plus the characters in the text "coconut"). As used in FIG. 6, "_" indicates a space. Chain node 623 is a formatting chain node and has an ID of "23", a CauseID of "1", and a Value of "<b>" representing a bold instruction. In the current embodiment, a length field in the chain node 623 indicates that the chain is 14 characters long, i.e., the bold instructions "<b>" in the formatting chain node 623 apply to fourteen characters. The fourteen bold instructions "<b>" in the formatting chain node 623 modify the text "pineapple lime" in character chain node 601a. In other embodiments, however, the length field is omitted from the chain node 623. In still other embodiments, the space character " " may be preserved in either of the two character chains.

User B italicizes "lime coconut", resulting in causal tree 62 based on user B's edits. The causal tree 62 includes the root node 600 and chain nodes 601b, 611, and 637. Chain node 601b is a character chain node has an ID of "1", a CauseID of "0", and a Value of "pineapple_" (the characters in the text "pineapple" plus a space). Character chain node 601b in turn causes another character chain node 611. Character chain node 611 has an ID of "11", a CauseID of "1", and a Value of "lime coconut". Character chain node 611 causes formatting chain node 637, which has a ID of "37", a CauseID of "11", and a Value of "<i>" representing an italicize instruction. In the present embodiment, a length field in the formatting chain node 637 indicates that the chain is 12 characters long, i.e., the twelve italicize instructions "<i>" in the formatting chain node 637 apply to twelve characters. The italicize instructions "<i>" in formatting chain node 637 modify the text "lime coconut" in the character chain node 611. In other embodiments, however, the length field is omitted from the chain node 637.

In an embodiment, User A and User B are editing the document simultaneously, or almost simultaneously. When the edits made by User A and User B are transmitted to the server, the edits are incorporated into a single causal tree 63 as shown in FIG. 6. Once the edits are incorporated, User A and User B will be accessing and viewing the same revision of the document, i.e., the revision of the document that includes the text "pineapple lime coconut", in which "pineapple" is bolded, "lime" is bolded and italicized, and "_coconut" (space plus the characters in the text "coconut") is italicized.

In more detail, causal tree 63 includes the root node 600 and several subsequent chain nodes. Immediately following the root node 600 is the character chain node 601b, which has an ID of "1", a CauseID of "0", and a Value of "pineapple_" (the characters in the text "pineapple" plus a space). Character chain node 601b in turn causes two chain nodes 611 and 623a. Chain node 623a is a formatting chain node and has an ID of "23", a CauseID of "1", a Value of "<b>", and a length of 10 corresponding to the number of characters in the text "pineapple" in character chain node 601b. Formatting chain node 623a is a bold instruction to modify the text "pineapple_" (the characters in the text "pineapple" plus a space) in chain node 601b. Formatting chain node 623a is a portion of formatting chain node 623 in causal tree 61, which corresponds to the edits made by User A.

Character chain node 611 is also caused by chain node 601b. Character chain node 611b has an ID of "11", a CauseID of "1", and a Value of "lime". In turn, character chain node 611b causes two formatting chain nodes 633 and 637b and another character chain node 615. Formatting chain node 633 has an ID of "33", a CauseID of "11", a value of "<b>", and a length of 4 corresponding to the number of characters in the text "lime". Formatting chain node 633 is a bold instruction to modify the text "lime" in the character chain node 611. Formatting chain node 633 is also a portion of the formatting chain node 623 in causal tree 61. Together, formatting chain nodes 623a and 633 correspond to the edits made by User A.

Character chain node 611b also causes formatting chain node 637b. Formatting chain node 637b has an ID of "37", a CauseID of "11", a Value of "<i>" representing an italicize instruction and a length of 4 corresponding to the number of characters in the text "lime". Formatting chain node 637b is an italicize instruction to modify the text "lime" in the character chain node 611b. Formatting chain node 637b is a portion of the formatting chain node 637, which corresponds to the edits made by User B in the causal tree 62.

Character chain node 615 is caused by character chain node 611b. Character chain node 615 has a ID of "15", a CauseID of "11", and a Value of "_coconut" (a space plus the characters in the text "coconut"). Character chain node 615 causes formatting chain node 641, which has an ID of "41", a CauseID of "15", a Value of "<i>", and a length of 8 corresponding to the number of characters in "coconut". Formatting chain node 641 is an italicize instruction to modify the text "_coconut" (a space plus the characters in the text "coconut") in the character chain 615. Together, formatting chain node 637b and 641 corresponds to the edits made by User B in formatting chain node 637 in the causal tree 62.

Figure 7A:
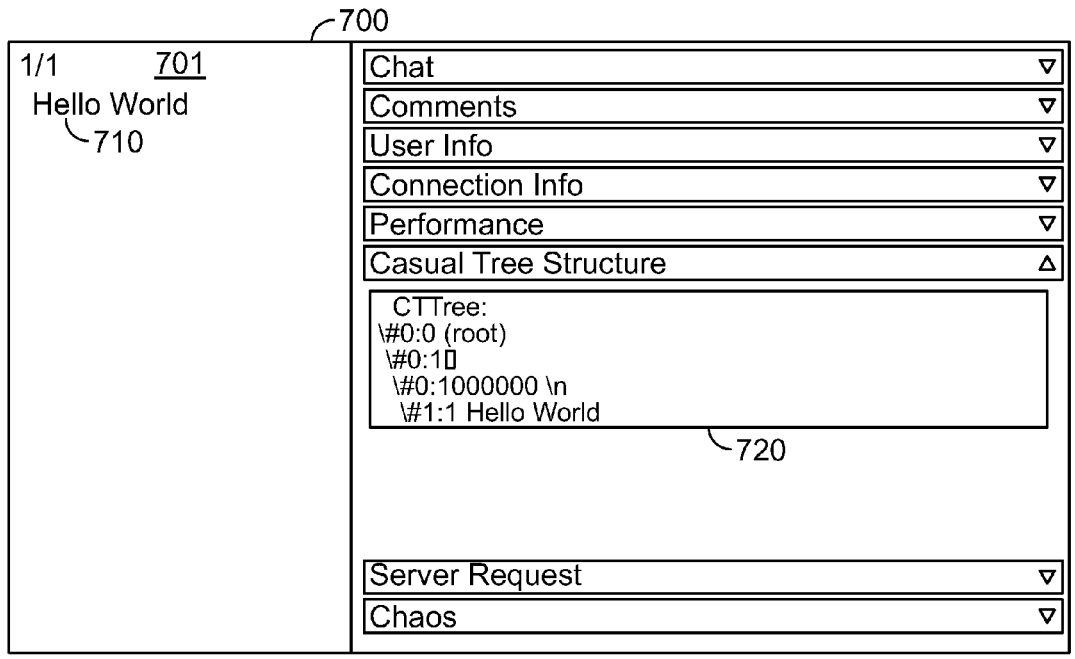
FIG. 7A is a screen shot diagram illustrating a collaborative editing application, according to an embodiment.

FIG. 7A is a screen shot diagram illustrating a collaborative editing application 700, according to an embodiment. The collaborative editing application 700 includes an editor window 701 and a causal tree structure 720. Although the causal tree structure 720 is shown in FIG. 7A, in other embodiments, the causal tree structure 720 may not be shown. Text "Hello World" 710 is shown in the editor window 701. In the corresponding causal tree structure 720, the causal tree structure 720 has a root node and a character chain node. The root node has an ID of "0". The character chain node has an ID of "1" and a Value of "Hello World".

The syntax of the causal tree structure 720 will be explained in more detail. In the causal tree structure 720, a chain node or a branch of the causal tree structure is represented as "#<site ID>:<stamp>[Value]". In FIG. 7A, the root node is represented as "#0:0 (root)." The line "#0:1☐" represents a subtree. The line "#0:1000000 \n" denotes a new line, which is used to begin paragraphs in the document. The line "#1:1 Hello World" represents the character chain node for the text "Hello World". The syntax shown for causal tree structure 720 is arbitrarily chosen and may be different in other embodiments.

In an embodiment, an instruction ID of the chain node includes a combination of the site ID and the stamp. For example, in FIG. 7A, the instruction ID is represented by "#<site ID>:<stamp>". The site ID is assigned to each client device by the server upon connecting to a document stored on the server. This way, every client session has a unique site ID. The stamp is a numeric value counter (e.g., an integer counter) of instructions entered or typed by a user (or instructions generated by the server) that is roughly synchronized across client devices. The next available numeric value of the stamp at each client device is determined based on the changes to the causal tree structure stored at the server, and the server broadcasts such changes to the client devices so that stamp values across client devices are sequential. In an embodiment, each user's edit instruction has a unique stamp value, and only one user's edit instruction can be assigned the next available stamp value in the instruction ID (e.g., next highest ID number for the causal tree). In other embodiments however, instructions from multiple users that are generated simultaneously may be assigned the same stamp value, and such instructions are distinguished from each other by their site IDs. In turn, the instruction ID is generated by client devices by combining the site ID and stamp. The instruction IDs thus generated are unique because even if the stamp portion of one client device collides with another client, the site ID portion of the instruction ID is unique across the client devices.

Although the instruction IDs in the present embodiment is generated at the client devices, in other embodiments, the instruction ID is generated by the server. In still other embodiments, the instruction ID may include a time stamp, which indicates the time at which the instruction is entered by the user.

In an embodiment, the site ID is used to identify the user, such that each user has a unique site ID. In various embodiments, each user is assigned the next available site ID when the user begins an editing session. For example, User A is assigned #1 as a site ID for a first editing session. When User A leaves the first editing session and begins a second editing session during which time User B is already editing the document, User A is assigned #2 as site ID for the second editing session while User B is assigned #1 as the site ID. In other embodiments, however, the site ID is not user session-specific and may be persistent for each user.

In various embodiments, the site ID is useful to resolve conflicts that may arise when edits from different users arrive simultaneously at the server (i.e., serves a tie-breaking function). In an embodiment, User A makes an edit to the document and User B also makes an edit to the document. User A's editing instruction is assigned a first instruction ID, a combination of User A's site ID and the next available stamp value. User B's editing instruction is assigned a second instruction ID, a combination of User B's site ID and the next available stamp value. In one scenario, User A's edit instruction and User B's edit instruction are assigned the same stamp value (due to network latency) and the instructions are received by the server at the same time. To resolve such conflict, the server processes the editing instruction with a lower site ID first. For instance, if User A is assigned site ID #1 and User B is assigned site ID #2, then the server will process User A's editing instructions prior to processing User B's editing instructions. In other embodiments, however, the user editing instruction associated with a higher site ID may take priority.

In other embodiments in which the instruction IDs include time stamps, the time stamp may be used (in place of or in addition to the site ID) to resolve conflicts that may arise when edits from different users arrive simultaneously at the server. As the time stamps are generated at the client devices when the users enters the edit, a user instruction associated with an earlier time stamp may take priority over a user instruction associated with a later time stamp, such that the user instruction associated with the earlier time stamp is processed first.

Figure 7B:
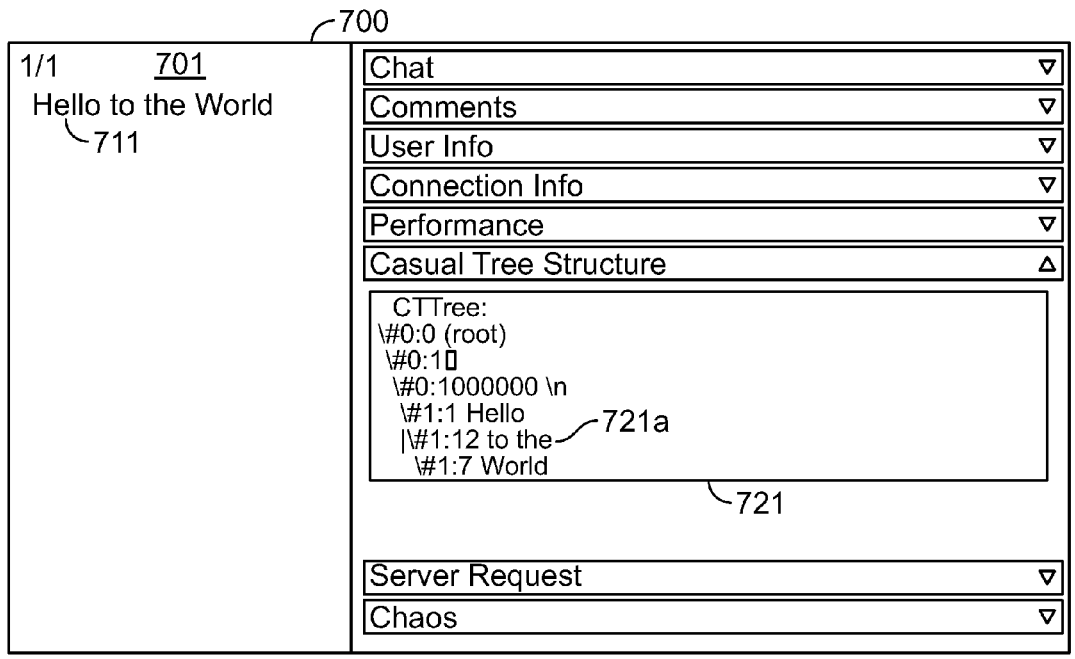
FIG. 7B is a screen shot diagram illustrating the collaborative editing application of FIG. 7A with insertion of text, according to an embodiment.

FIG. 7B is a screen shot diagram illustrating the collaborative editing application 700 of FIG. 7A with insertion of text, according to an embodiment. A user adds "to the" (the characters in the text "to the" plus a space) between "Hello" (the characters in the text "Hello" plus a space) and "World", forming a new phrase "Hello to the World" 711 shown in the editor window 701. The corresponding causal tree 721 is shown in the causal tree structure window. The causal tree 721 has a root node and three character chain nodes. The "Hello" character chain node has an instruction ID of "#1:1" (site ID=1 and stamp=1) and is caused by the root node. The "World" character chain node has an instruction ID of "#1:7" (site ID=1 and stamp=7) and is caused by the "Hello" character chain node. Character chain node 721a corresponds to the added text "to the". Character chain node 721a has an instruction ID of "#1:12" (site ID=1 and stamp=12) and is also caused by the "Hello" chain node. In other words, the "Hello" character chain node is the parent chain node of both the "World" character chain node and the new character chain node 721a.

Figure 7C:
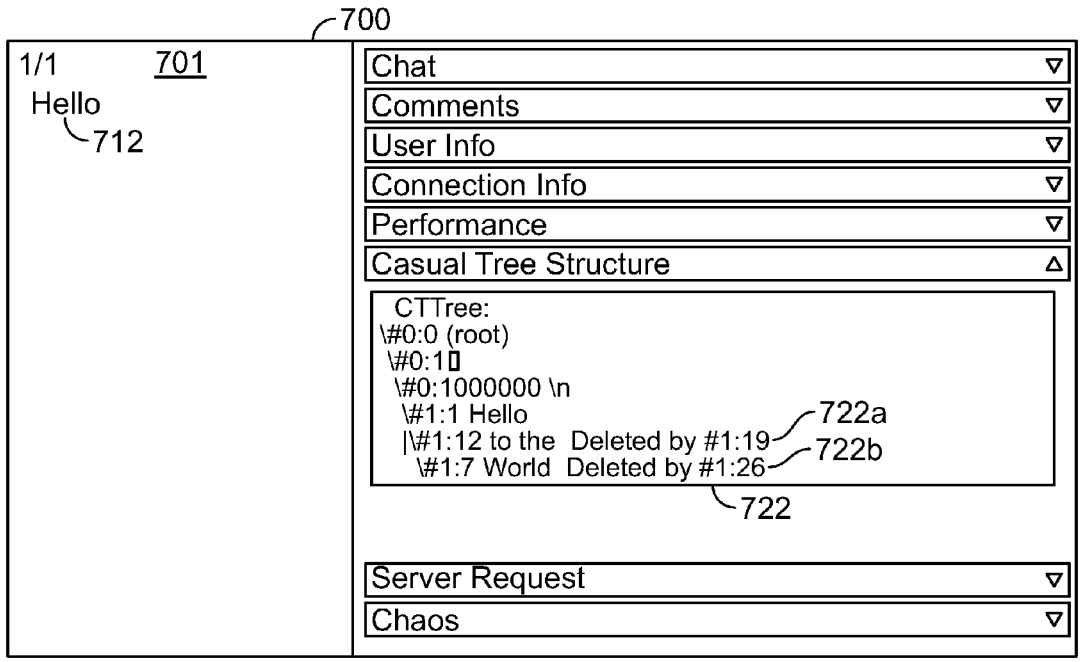
FIG. 7C is a screen shot diagram illustrating the collaborative editing application of FIG. 7B with deletion of text, according to an embodiment.

FIG. 7C is a screen shot diagram illustrating the collaborative editing application 700 of FIG. 7B with deletion of text, according to an embodiment. The user now deletes "to the World" (a space plus the characters in the text "to the World") from the phrase "Hello to the World". The resultant text "Hello" 712 is shown in the editor window 701. In the corresponding causal tree structure 722, two deletion chain nodes 722a and 722b are added. The deletion chain node 722a follows and is caused by character chain node 721a and has an instruction ID of "#1:19" (site ID=1 and stamp=19). The deletion chain node 722b follow and is caused by the "World" character chain node. The deletion chain node 722b has an instruction ID of "#1:26" (site ID=1 and stamp=26). In an embodiment, a length field for the deletion chain nodes 722a and 722b is not shown because it is assumed that the deletion chain node has the same length of its parent node. In other embodiment, a length field may be added to the syntax for the causal tree structure 722 to denote the length of the deletion chain nodes 722a and 722b.

Figure 8A:
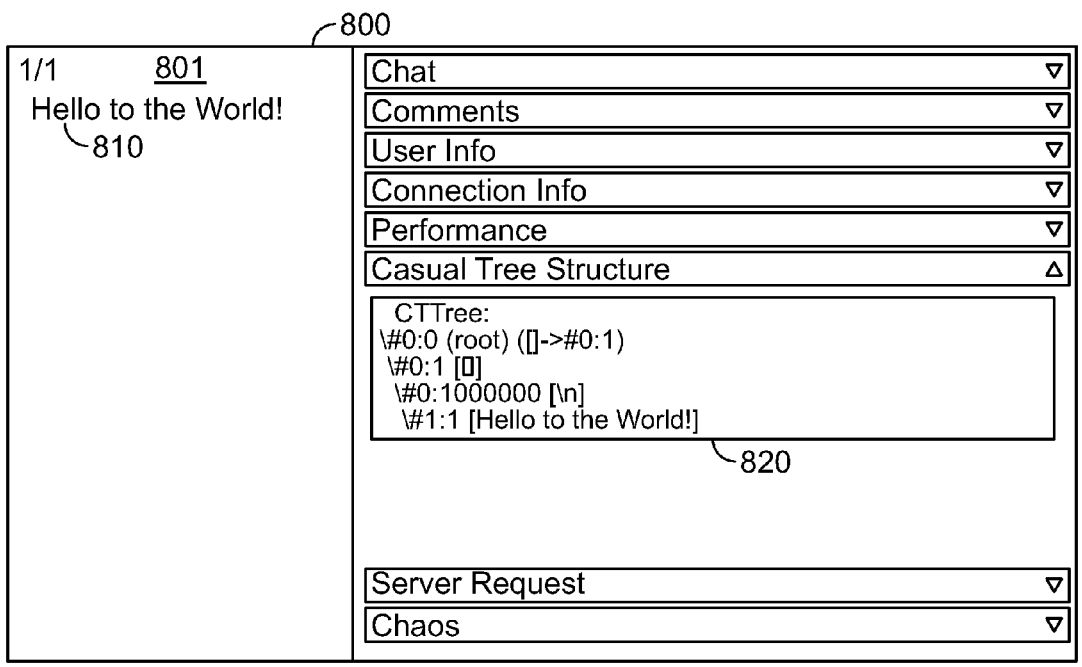
FIG. 8A is a screen shot diagram illustrating a collaborative editing application, according to an embodiment.

FIG. 8A is a screen shot diagram illustrating a collaborative editing application 800, according to an embodiment. The collaborative editing application 800 includes an editor window 801 and a causal tree structure 820. Although the causal tree structure 820 is shown in FIG. 8A, in other embodiments, the causal tree structure 820 may not be shown. Text "Hello to the World!" 810 is shown in the editor window 801. In the corresponding causal tree structure 820, the causal tree has a root node and a character chain node. The character chain node has an instruction ID of "#1:1" (site ID=1 and stamp=1) and a Value of "Hello to the World!" as shown in brackets ([ ]).

Figure 8B:
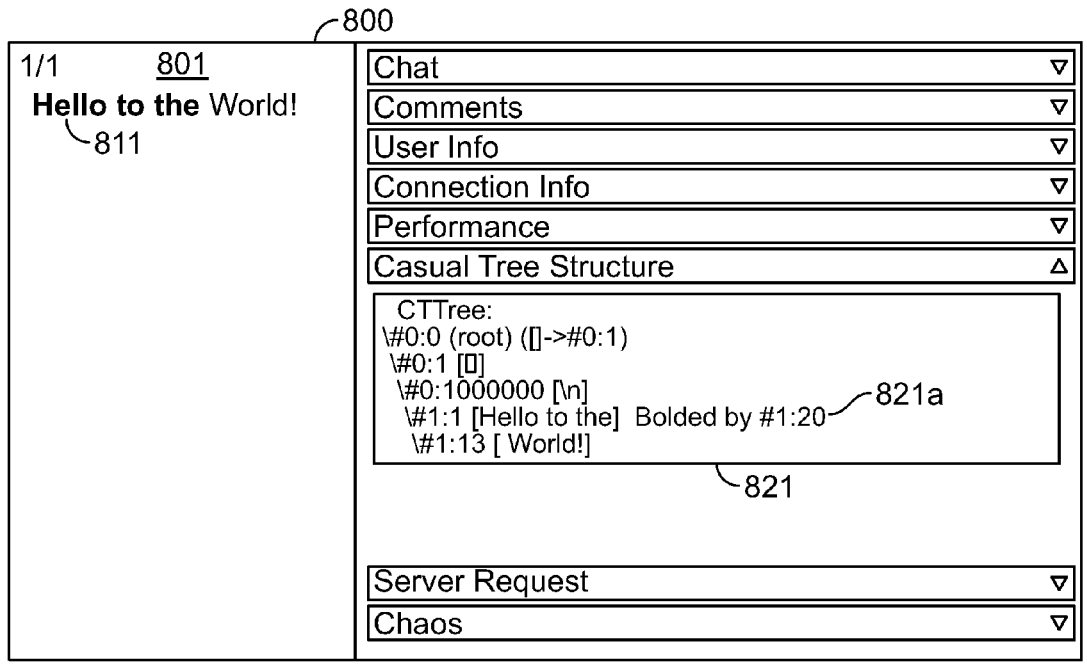
FIG. 8B is a screen shot diagram illustrating the collaborative editing application of FIG. 8A with formatting change, according to an embodiment.

FIG. 8B is a screen shot diagram illustrating the collaborative editing application 800 of FIG. 8A with formatting change, according to an embodiment. A user bolds "Hello to the" in "Hello to the World!" via a bold instruction, as shown in the editor window 801. The corresponding causal tree structure 821 is shown in the causal tree structure window. The causal tree structure 821 has a root node and three character chain nodes. The "Hello to the" character chain node has an instruction ID of "#1:1" (site ID=1 and stamp=1) and is caused by the root node. The "World!" (a space plus the characters in the text "World!") character chain node has an instruction ID of "#1:13" (site ID=1 and stamp=13) and is caused by the "Hello to the" character chain node. Formatting chain node 821a is caused by the "Hello to the" character chain node. Formatting chain node 821a has an instruction ID of "#1:20" (site ID=1 and stamp=20). The formatting chain node 821a is a bold instruction to modify the "Hello to the" character chain node. In an embodiment, a length field for the formatting chain node 821a is not shown because it is assumed that the formatting chain node has the same length of its parent node. In other embodiment, a length field may be added to the syntax for the causal tree structure 821 to denote the length of the formatting chain node 821a.

Figure 8C:
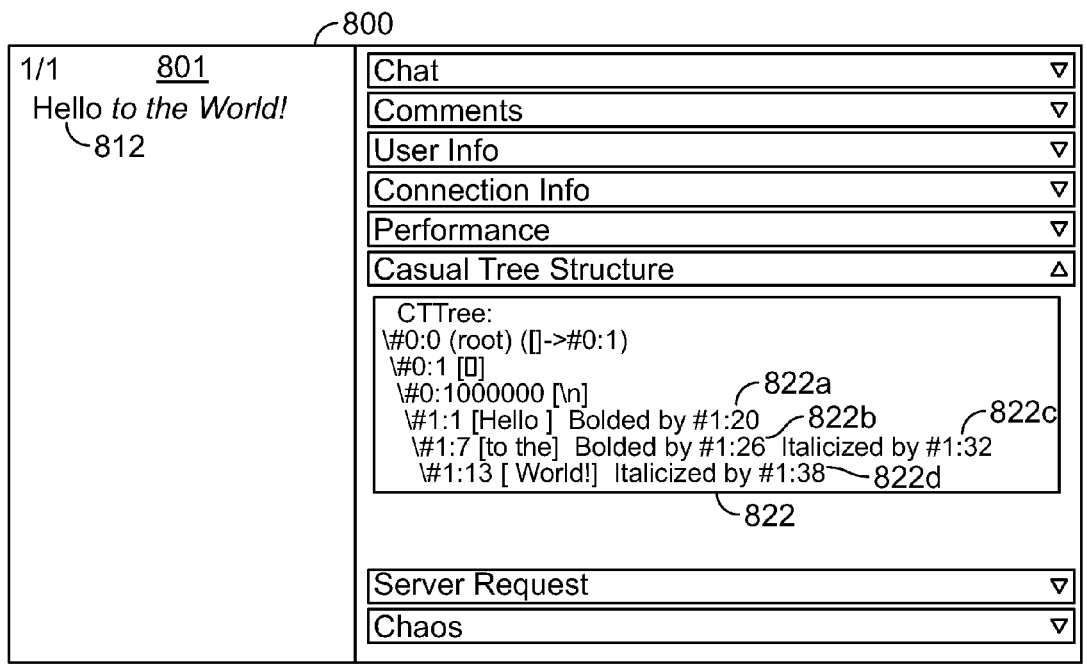
FIG. 8C is a screen shot diagram illustrating the collaborative editing application of FIG. 8B with another formatting change, according to an embodiment.

FIG. 8C is a screen shot diagram illustrating the collaborative editing application 800 of FIG. 8B with another formatting change, according to an embodiment. The user now italicizes "to the World!" in the phrase "Hello to the World!" via an italicize instruction, as shown in the editor window 801. The corresponding causal tree structure 822 illustrates the formatting change. The causal tree structure 822 includes a root node. Following the root node is the "Hello" (the text "Hello" plus a space) character chain node, which has an instruction ID of "#1:1" (site ID=1 and stamp=1). As shown in the editor window 801, "Hello" is bolded, and the bold instruction corresponds to formatting node chain 822a. Formatting node chain 822a is caused by the "Hello" character chain node and has an instruction ID of "#1:20" (site ID=1 and stamp=20).

Character chain node "to the" is also caused by the "Hello" character chain node. The character chain node "to the" has an instruction ID of "#1:7" (site ID=1 and stamp=7). Two formatting chain nodes follow "to the" character chain node. Formatting chain node 822b has an instruction ID of "#1:26" (site ID=1 and stamp=26) and is a bold instruction, which indicates that "to the" has been bolded. Formatting chain node 822c has an instruction ID of "#1:32" (site ID=1 and stamp=32) and is an italicize instruction, which indicates that "to the" has been italicized. Both formatting chain nodes 822b and 822c are caused by the character chain node "to the".

Character chain node "World!" (a space plus the text "World!") is caused by character chain node "to the". The character chain node "World!" has an instruction ID of "#1:13" (site ID=1 and stamp=13). A formatting chain node 822d follows the character chain node "World!". Formatting chain node 822d has an instruction ID of "#1:38" (site ID=1 and stamp=13) and is an italicize instruction, which indicates that "World!" has been italicized. Formatting chain node 822d is caused by the character chain node "World!".

Although the instruction IDs in the embodiments of FIGS. 7A-7C and 8A-8C are a combination of site IDs and stamps, in other embodiments, the instruction IDs may be represented by only a sequence of integers without the site IDs, i.e., the stamps are the instruction IDs.

In various embodiments, a causal tree is restructured into smaller, even-sized branches. If a tree is unbalanced, then the restructured or rebalanced tree contains more branches than the original tree in an embodiment. Depending on the editing instructions, the restructured or rebalanced tree may contain less branches than the original tree. The branches make it easier for the system to support the client-server architecture where the server has the whole document, and the client device only needs the part actively used by the client device. This way, rather than transmitting the entire tree to a client device, only the branches that are needed by a user are sent to that user's client device. Furthermore, transmitting just the necessary branches, which are smaller than the entire tree structure, reduces transmission time when sent from the server to the client device, reduces processing time on the client device, and decreases the horsepower requirements of the client device. This is particularly useful when the client device is a mobile phone, tablet, or other handheld device that may have lower computational power.

Figures 9, 10A:
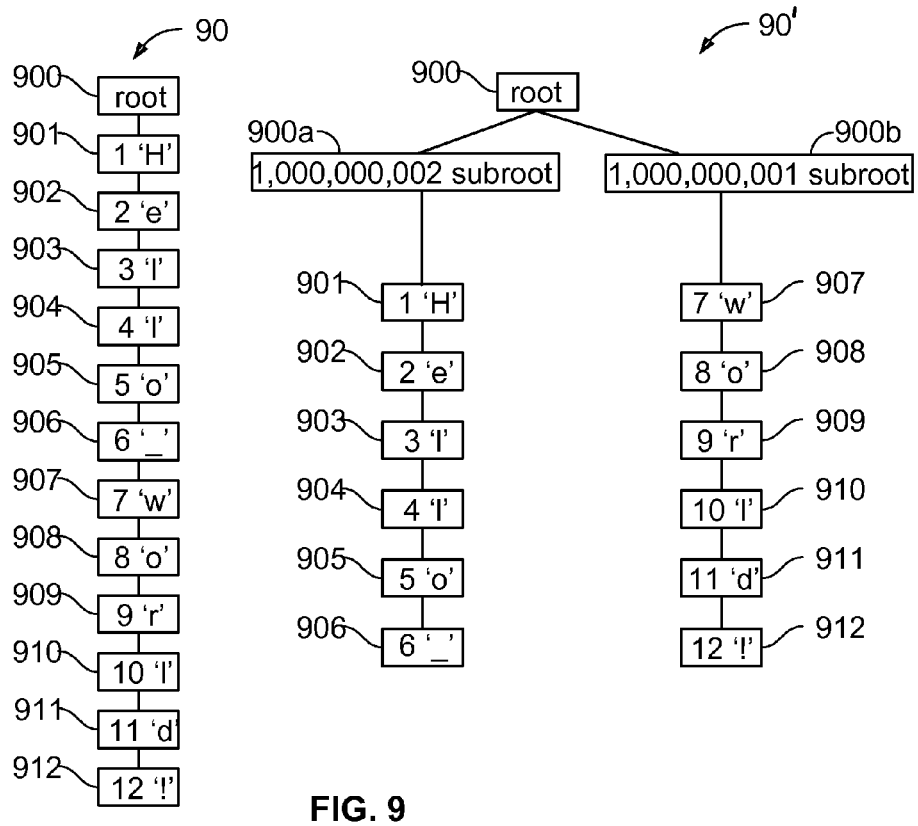
FIG. 9 is a diagram illustrating a rebalancing algorithm for generating a causal tree having even-sized branches, according to an embodiment.
FIG. 10A is a screen shot diagram illustrating a spreadsheet application, according to an embodiment.

FIG. 9 is a diagram illustrating a rebalancing algorithm for generating a causal tree having even-sized branches, according to an embodiment. A causal tree has even-sized branches when there are approximately equal number of nodes in each branch. Compression of a causal tree may be performed in real time, i.e., while the users are editing a document. Rebalancing of a causal tree may be performed offline, i.e., after all users have finished editing a document and all editing instructions are received by the server. Rebalancing may also be performed in real time if the causal tree becomes too off-balanced (i.e., the difference in the number of nodes between two branches become too large). In that case, the server temporarily suspends the users' editing sessions to rebalance the causal tree.

Referring to FIG. 9, a document contains the text "Hello World!". A causal tree 90 corresponding to the text is generated and includes a root node 900 and character nodes 901 to 912. Each character in the character nodes 901 to 912 is assigned an ID. For example, character node 901 is assigned an ID of "1" and has a Value of "H". Character node 906 is assigned an ID of "6" and has a Value of "_" corresponding to a space. Character node 907 is assigned a ID of "7" and has a Value of "w". Character node 912 is assigned a ID of "12" and has a Value of "!".

When a rebalancing algorithm is applied to the causal tree 90, a rebalanced tree 90' is generated. The rebalanced tree 90' includes the root node 900. Two subroot nodes 900a and 900b are generated. Subroot node 900a has an ID of "1,000,000,002" and subroot node 900b has an ID of "1,000,000,001". Subroot nodes 900a and 900b are invisible nodes, i.e., they are not visible to the user when the document is composed. Character nodes 901 to 906 follow subroot node 900a, and character node 901 is caused by subroot node 900a. Instead of following character node 906, character nodes 907 to 912 now form a second branch in the rebalanced tree 90'. Character node 907 is now caused by subroot node 900b and its CauseID is changed from 6 to 1,000,000,001. Although the CauseID of character node 907 is modified, the ID of character node 907 remains the unchanged. As shown in FIG. 9, rebalanced tree 90' thus has two chains formed by character nodes 901 to 906 and character nodes 907 to 912, with each chain having six characters.

The rebalancing algorithm generates the invisible subroot nodes to allow redistribution of nodes in the causal tree. The invisible subroot nodes also preserve the proper traversal order of the nodes in the causal tree. For example, in rebalanced tree 90', because the ID of subroot node 900a is greater than the ID of subroot node 900b, the branch beginning with subroot node 900a (character nodes 901 to 906) is traversed before the branch beginning with subroot node 900b (character nodes 907 to 912). In other embodiments, however, the ID of subroot node 900a may be less than the ID of subroot node 900b, and the branch beginning with subroot node 900a is traversed before the branch beginning with subroot 900b.

In still other embodiments, subroot nodes are not generated. Instead, an additional identifier is added to the first node in each branch of the rebalanced tree to indicate the order in which the branches of the rebalanced causal tree should be traversed.

This example, though trivial in size, illustrates what happens with a much larger document. Many business documents number in the hundreds of pages; some, in the thousands of pages. Due to limited display space on computer devices a user may only need to display no more than 4 pages at a time. Rather than transmitting the entire causal tree representing the thousands of pages and having a client device, especially a mobile device with limited computational power, work through pagination, the server can perform pagination, rebalancing the causal tree into branches appropriately limited in size to what can be displayed on the client device. The server then sends only the branch that represents the content to be displayed on the client device.

In various embodiments, only the ID (shown as the instruction ID in the causal tree structures in FIGS. 7A-7C and 8A-8C) of a chain node is persistent. The persistent nature of the ID allows the server to track all changes made in the document. A comparison of the document (e.g., redline or blackline) at any point in time may be generated by traversing the nodes of the causal tree structure.

Other example instructions that are suitable for a causal tree structure include the copy and paste instruction and the cut and paste instruction. Regarding the copy and paste instruction, the branches and/or nodes that are associated with the copied content are duplicated into new branches and/or nodes. The new branches and/or nodes have a different CauseID than the original branches and/or nodes, depending on where the copied content is pasted. Regarding the cut and paste instruction, prior to creating the duplicate branches and/or nodes, delete instruction nodes are added to follow the original branches and/or nodes.

A causal tree may be used to represent content other than a conventional computer document. In an embodiment a causal tree may be created for every cell in a spreadsheet to provide the benefits of tracking changes to a cell's value over time, provide for visual formatting on individual characters in that cell, control over access to the value, or other cell and character-specific capabilities as represented in the causal tree of that cell. In one embodiment it could be used to track changes to a formula that generates a cell's value.

In another embodiment, a causal tree is created for a spreadsheet with each cell being a branch of that spreadsheet. For example, FIG. 10A is a screen shot diagram illustrating a spreadsheet application, according to an embodiment. FIG. 10A shows a spreadsheet 1050 with cells A9, A10, A11, A12, and A13 having values. A causal tree structure is generated for the spreadsheet 1050, and each cell A9, A10, A11, A12, and A13 is a branch caused by a root node of the spreadsheet causal tree structure.

Figures 10B, 10C:
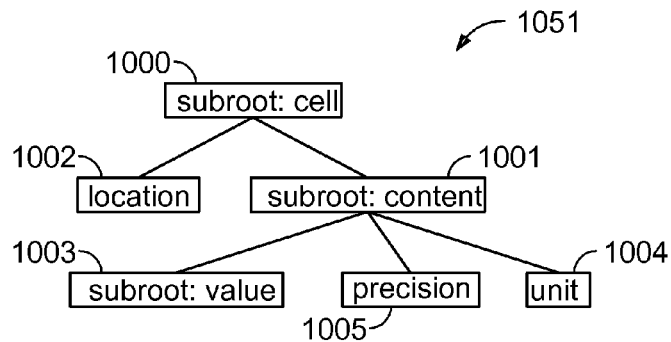
FIG. 10B is a diagram illustrating a general causal tree structure of a cell in the spreadsheet application of FIG. 10A, according to an embodiment.
FIG. 10C is a screen shot diagram illustrating a formula in the spreadsheet application of FIG. 10A, according to an embodiment.

FIG. 10B is a diagram illustrating a general causal tree structure 1051 of a cell in the spreadsheet application of FIG. 10A, according to an embodiment. The causal tree structure 1051 includes a subroot node 1000 ("subroot: cell"), which serves as the root node of the cell. The cell subroot node 1000 in turn causes two branches. The first branch includes a location node 1002, which indicates the location of a cell in the spreadsheet (e.g., cell "A9"). The second branch includes a content subroot 1001 ("subroot: content"). In this embodiment, the content subroot 1001 causes three branches, value subroot node 1003 ("subroot: value"), precision node 1005, and unit node 1004. The value subroot node 1003 indicates the value of the cell (e.g., "$10.00" for cell "A9"). In this embodiment, the precision node 1005 and unit node 1004 are metadata associated with the data in the cell. For example, for cell "A9," the unit node 1004 would have a value of 10^-2, indicating that the precision of the value is to the hundredth, and the precision node 1005 would have a value of "USD", indicating that the unit for the cell is US dollars. In other embodiments, the content subroot 1001 may cause nodes with metadata other than or in addition to precision node 1005 and unit node 1004. Such metadata may include, for example, date of measurement, and other metadata that may be associated with the data or cell.

FIG. 10C is a screen shot diagram illustrating a formula in the spreadsheet application of FIG. 10A, according to an embodiment. As shown in FIG. 10C, the selected cell A13 contains a formula "=SUM(A8:A12)". The formula contained in cell A13 corresponds to a causal tree branch, such as that shown in FIG. 10D, according to an embodiment.

Figures 10D, 11A:
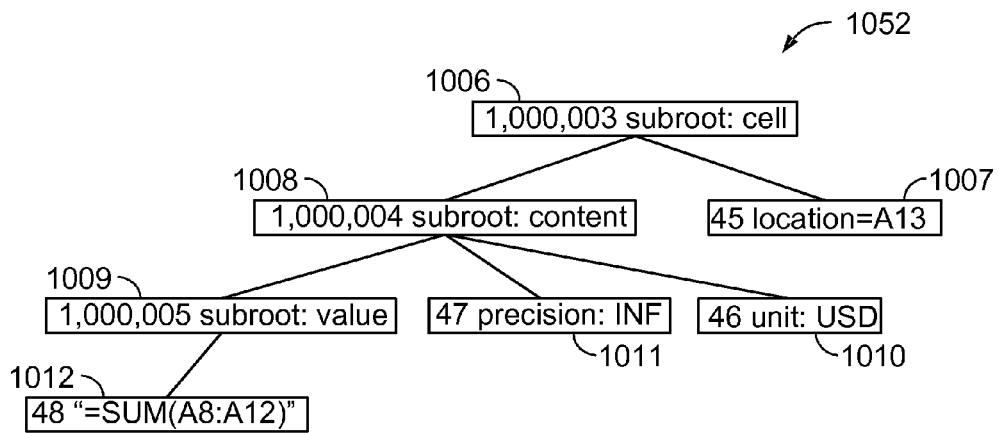
FIG. 10D is a diagram illustrating a causal tree structure of the formula of FIG. 10C, according to an embodiment.
FIG. 11A is a screen shot diagram illustrating a spreadsheet application, according to another embodiment.

Referring to FIG. 10D, the causal tree branch 1052 for cell A13 includes a cell subroot node 1006 ("subroot: cell"), which may be an invisible node in some embodiments. The cell subroot node 1006 has an ID of "1,000,003". Following the subroot node 1006 are content subroot node 1008 ("subroot: content") and location node 1007. The content subroot node 1008 has an ID of "1,000,004", and may be an invisible node in some embodiments. Location node 1007 has an ID of "45" and indicates that the location of the cell is "A13". The content subroot node 1008 causes three branches: value subroot node 1009 ("subroot: value"), precision node 1011, and unit node 1010. The unit node 1010 has an ID of "46" and indicates that the unit of the cell is "USD" or US dollars. The precision node 1011 has an ID of "47" and indicates that the precision of the data in the cell is infinite ("INF"). The value subroot node 1009 has an ID of "1,000,005", and may be an invisible node in some embodiments. The value subroot node 1009 in turn causes node 1012, which indicates the instruction in the cell. The node 1012 has an ID of "48" and indicates that the formula "=SUM(A8:A12)" is the instruction in the cell. In an embodiment, the formula in a spreadsheet cell is an instruction that is understood by the spreadsheet application, which interprets and processes the instruction. For instance, when node 1012 is reached, the spreadsheet application understands that the formula "=SUM(A8:A12)" calls for the summation of the values in cells A8 through A12, and processes the formula to obtain the sum.

FIG. 11A is a screen shot diagram 1150 illustrating a spreadsheet application, according to an embodiment. The screen shot diagram 1150 has a different cell A12 than the screen shot diagram 1050 shown in FIG. 10A. In FIG. 11A, the unit associated with cell A12 is "€", not "$" as shown in FIG. 10A.

Figure 11B:
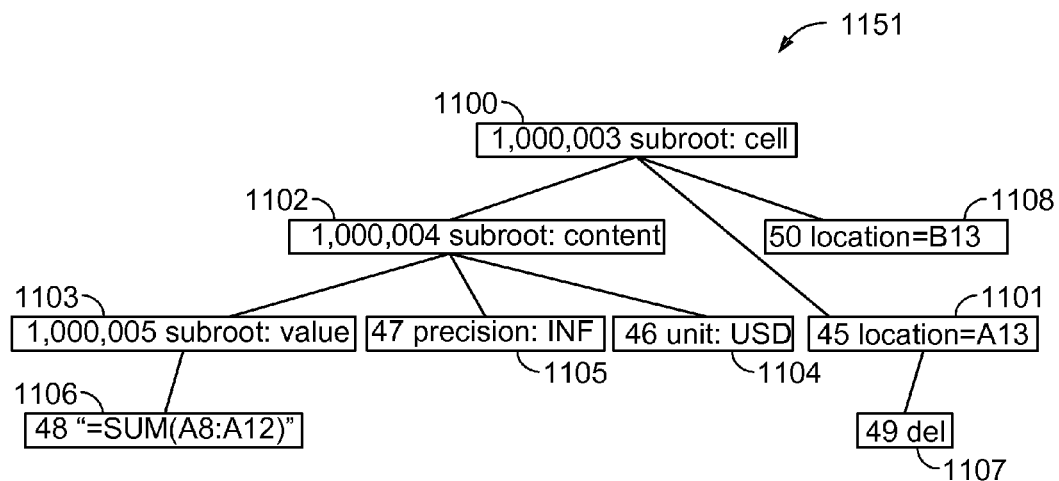
FIG. 11B is a diagram illustrating a causal tree structure when the formula of FIG. 11A is moved to another cell, according to an embodiment.

FIG. 11B is a diagram illustrating a causal tree structure 1151 when the formula of FIG. 11A is moved to another cell, according to an embodiment. The causal tree structure 1151 begins with a cell subroot 1100 having an ID of "1,000,003."

The cell subroot 1100 may be an invisible node in some embodiments. Following the subroot node 1100 are content subroot node 1102 ("subroot: content") and location node 1108. The content subroot node 1102 has an ID of "1,000,004", and may be an invisible node in some embodiments. Location node 1101 has an ID of "45" and indicates that the location of the cell is "A13". The content subroot node 1102 in turn causes three branches: value subroot node 1103 ("subroot: value"), precision node 1105, and unit node 1104. The unit node 1104 has an ID of "46" and indicates that the unit of the cell is "USD" or US dollars. The precision node 1105 has an ID of "47" and indicates that the precision of the data in the cell is infinite ("INF"). The value subroot node 1103 has an ID of "1,000,005", and may be an invisible node in some embodiments. The value subroot node 1103 in turn causes node 1106, which indicates the instruction in the cell. The node 1106 has an ID of "48" and indicates that the formula "=SUM(A8:A12)" is the instruction in the cell.

In the present embodiment, the formula "=SUM(A8:A12)" is moved from cell A13 to B13. With this edit, a delete instruction "del" is added after the location node 1101 as node 1107. Node 1107 has an ID of "49", which is the next available ID in the causal tree structure. Another location node 1108 is added. The location node 1108 is caused by the cell subroot node 1100 and has an ID of "50." The location node 1108 indicates that the location of the formula is now in cell "B13".

Figure 11C:
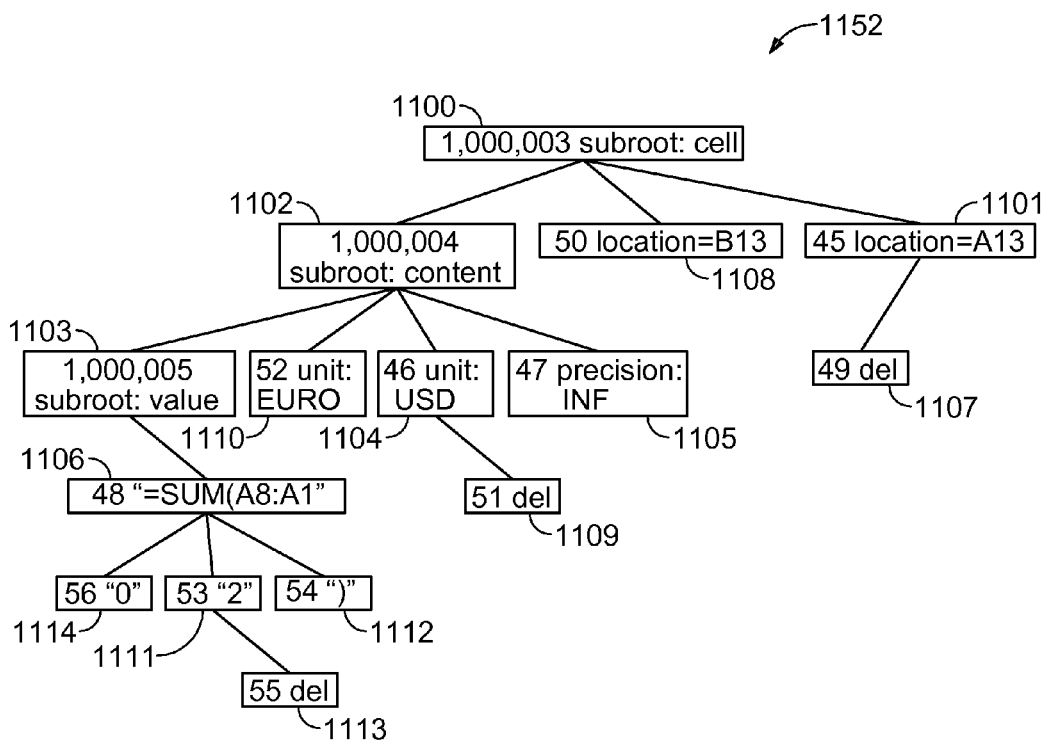
FIG. 11C is a diagram illustrating a causal tree structure when the formula of FIG. 11A is moved to another cell and edited, according to an embodiment.

FIG. 11C is a diagram illustrating a causal tree structure 1152 when the formula of FIG. 11A is moved to another cell and then edited, according to an embodiment. The causal tree structure 1152 is based on the causal tree structure 1151 of FIG. 11A, and the descriptions of like-numbered elements are omitted for brevity.

In FIG. 11C, the formula "=SUM(A8:A12)" is edited to "=SUM(A8:A10)" having a unit of "Euro" instead of "USD", after the formula is moved from cell A13 to cell B13. First, the unit of the formula is revised. Following the unit node 1104, a delete instruction node 1109 is added. The delete instruction node 1109 has an ID of "51" and a value of "del" indicating the delete instruction. Together, unit node 1104 and deletion node 1109 indicate that the unit "USD" is no longer the unit of the formula. When the unit of the formula is changed to "Euro," new unit node 1110 is created. New unit node 1110 has an ID of "52" and a value of "EURO" indicating that the new unit associated with the formula is "Euro."

The edits with respect to the text of the formula is reflected in the casual tree branch beginning with the node 1106. The node 1106 has an ID of "48" and indicates that the unedited portion of the formula is "=SUM(A8:A1". The node 1106 causes nodes 1111, 1112, and 1114. Node 1111 has an ID of "53", indicates that it follows node 1106, and a value of "2". A delete instruction node 1113 is generated following node 1111 because "2" is deleted from the formula. The delete instruction node 1113 has an ID of "55," indicates that it follows node 1111 and a value of "del" indicating the delete instruction. Node 1112 follows the node 1106 and has an ID of 54 and a value of ")". The "0" added to the formula is indicated in node 1114, which follows the node 1106. Node 1114 has an ID of "56" and a value of "0".

As noted earlier, the value or instruction of a node is not restricted by the causal tree, but rather only by the syntax understood by an application that processes and interprets the value or instruction. For example, the i18n character set can be represented without an impact on the causal tree; the application that interprets it does need to know how to interpret the values.

Figure 12:
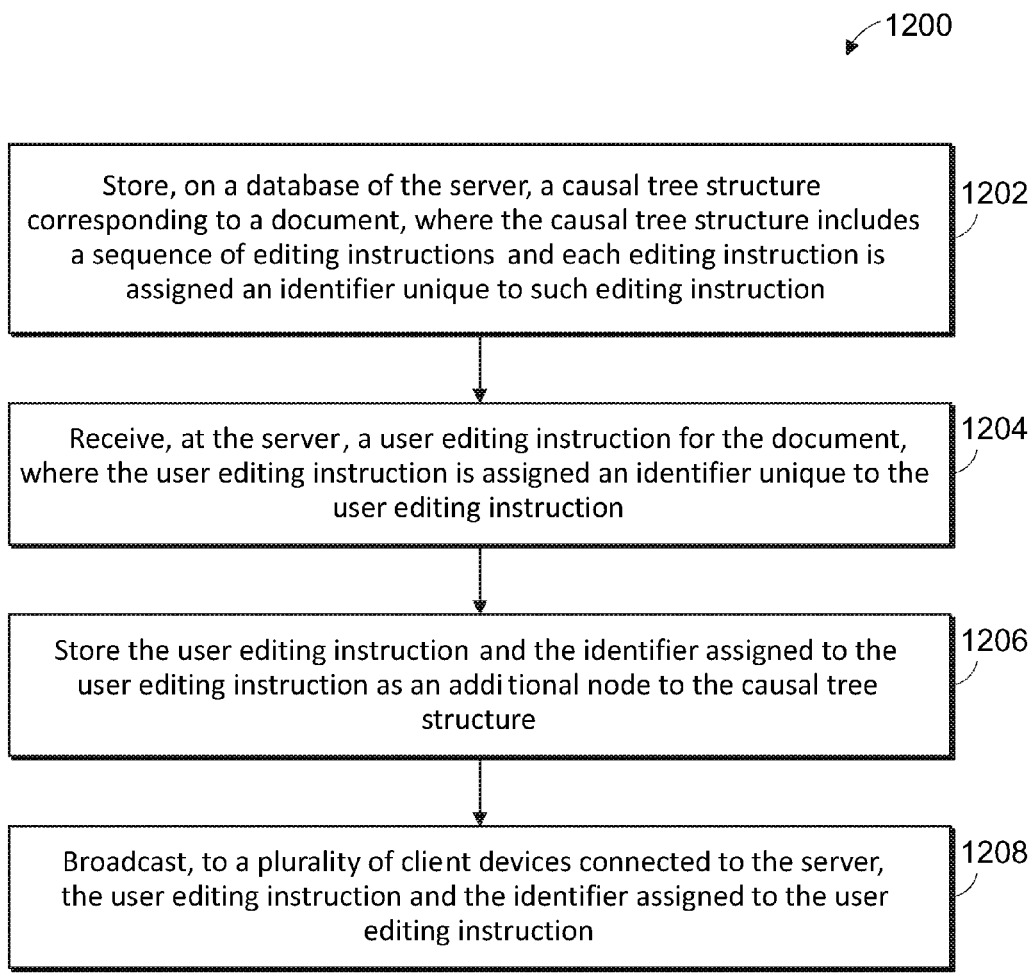
FIG. 12 is a flowchart illustrating an example method, implemented on a server, for editing a document, according to an embodiment.

FIG. 12 is a flowchart illustrating an example method 1200, implemented on a server, for editing a document, according to an embodiment. In some embodiments, the method 1200 is implemented by the productivity server 100 of FIG. 1A, which interacts with the database server 110 and the client devices 104, 106, 108. FIG. 12 is described with reference to FIG. 1A for explanatory purposes. In other embodiments, however, the method 1200 is implemented by another suitable computing device.

At 1202, the productivity server 100 stores, on a database of the productivity server 100 or on the database server 110, a causal tree structure (e.g., a data structure) corresponding to a document. The document may be stored on the database of the productivity server 100 or the database server 110. The causal tree structure includes a sequence of editing instructions, and each editing instruction is assigned an identifier unique to such editing instruction. In an embodiment, the identifiers of the editing instructions in the causal tree structure are assigned by client devices when these edit instructions are received by the client devices (e.g., when the editing instructions are entered by a user). In other embodiments, for example when an editing instruction is too large for a client device to process, upon receiving the editing instruction, the server assigns the editing instruction an identifier and processes and applies the editing instruction to the causal tree structure maintained by the server. In still other embodiments, the causal tree structure contains server-generated instructions (e.g., creation of a document, re-balance of the causal tree structure, or externally updated link content), and these server-generated instructions are assigned identifiers by the server.

At 1204, the productivity server 100 receives, via its network interface 140, a user editing instruction for the document, where the user editing instruction is assigned an identifier unique to the user editing instruction. In an embodiment, the identifier unique to the user editing instruction is assigned by the client device after receiving the user editing instruction. Then at 1206, the productivity server 100 stores, via its processor 130, the user editing instruction and the identifier assigned to the user editing instruction as an additional node to the causal tree structure. At 1208, the productivity server 100 broadcasts, to a plurality of client devices (e.g., client devices 104, 106, and 108) connected to the productivity server 100, the user editing instruction and the identifier assigned to the user editing instruction.

In an embodiment, the identifier assigned to the user editing instruction may include a site identifier and a stamp. The site identifier is unique to an editing session of the user at a client device. The stamp is a numeric value (e.g., an integer value) based on identifiers assigned to editing instructions in the causal tree structure. In an embodiment, the stamp represents temporal relativeness to all other identifiers in the same causal tree structure, which allows the determination of the history of edits to the document. In some embodiments, the number of editing instructions in the causal tree may be reduced but the identifiers will continue to increment.

In still another embodiment, the identifier assigned to the user editing instruction may further include a cause identifier, where the cause identifier is an identifier of a prior editing instruction in a node in the causal tree structure that precedes the additional node.

In yet another embodiment, the document may be composed by traversing identifiers of the editing instructions in a sequential order (e.g., in an ascending or descending order). In still other embodiments, the user editing instruction may include an instruction to modify a series of consecutive data in the document. The series of consecutive data, for example, may be a string of characters that is inserted or deleted by the user.

In an embodiment, each editing instruction in the causal tree structure may include at least one instruction selected from the group consisting of a modification of a value, a modification of metadata, a link to another node of the causal tree structure, a link to a node in another causal tree structure corresponding to another document, a link to the other causal tree, and a link to data residing outside the causal tree structure.

In another embodiment, the causal tree structure may include an editing instruction that is assigned a cause identifier. The causal tree structure may further include a second editing instruction that is assigned the same cause identifier as the editing instruction. The editing instruction and the second editing instruction may form separate branches of the causal tree structure.

Figure 13:
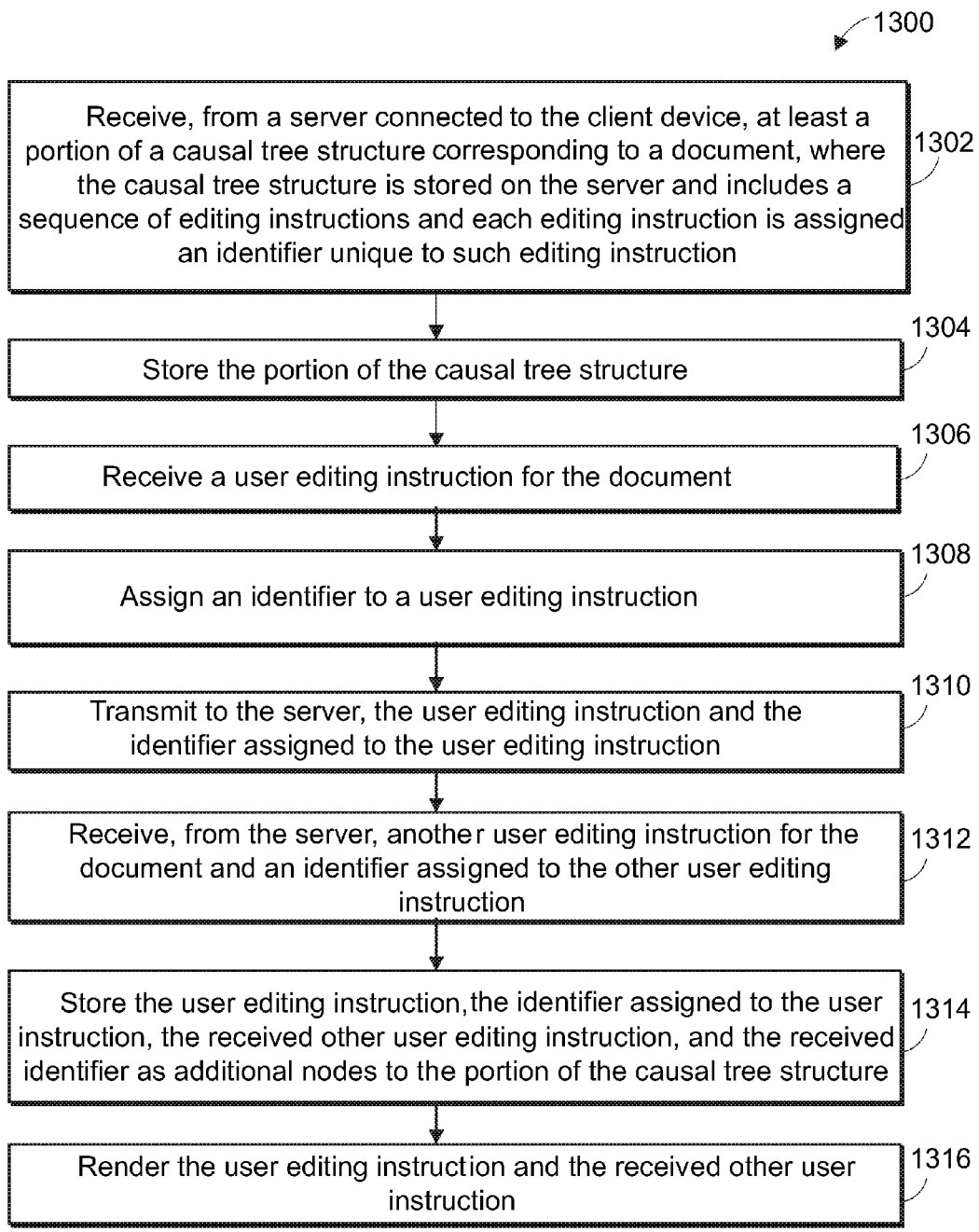
FIG. 13 is a flowchart illustrating an example method, implemented on a client device, for editing a document, according to an embodiment.

FIG. 13 is a flowchart illustrating an example method 1300, implemented on a client device, for editing a document, according to an embodiment. In some embodiments, the method 1300 is implemented by any of the client devices 104, 106, 108 connected to the productivity server 100 and the database server 110. FIG. 13 is described with reference to FIG. 1A for explanatory purposes. In other embodiments, however, the method 1300 is implemented by another suitable computing device.

At 1302, the client device 104 receives, from the productivity server 100 or the database server 110, at least a portion of a causal tree structure corresponding to a document. The client device 104 may receive the portion of a causal tree structure in response to a user request to access, view, and/or edit the corresponding portion of the document. The causal tree structure is stored on the database server 110 (or a database of the productivity server 100) and includes a sequence of editing instructions. Each editing instruction is assigned an identifier unique to such editing instruction.

At 1304, the client device 104 stores the received portion of the causal tree structure in its memory. At 1306, the client device 104 receives a user editing instruction for the document input by a user. At 1308, the client device 104 assigns, using its processor 130, an identifier to the user editing instruction.

At 1310, the client device 104 transmits, to the productivity server 100, the user editing instruction and the identifier assigned to the user editing instruction. At 1312, the client device 104 receives, from the productivity server 100, another user editing instruction for the document and an identifier assigned to the other user editing instruction. In an embodiment, the other user editing instruction is an instruction transmitted to the productivity server 100 by another client device (e.g., client device 106) from another user who is collaboratively editing the same document.

At 1314, the client device 104 stores the user editing instruction and the identifier assigned to the user instruction, and the received other user editing instruction and the received identifier as additional nodes to the portion of the causal tree structure stored on the client device 104. At 1316, the client device 104 processes and renders the user editing instruction and the received other user instruction, e.g., display edits to the document made by the user of client device 104 and the user of client device 106.

In an embodiment, the client device 104 assigns the identifier to the user editing instruction by assigning a site identifier and a stamp. The site identifier is unique to the user's editing session on the client device 104. The stamp is a numeric value (e.g., an integer value) based on identifiers assigned to editing instructions in the causal tree structure stored on the server.

In various embodiments, the client device 104 maintains a "maxStamp" numeric counter. When the client device 104 needs to generate or assign an identifier to a user editing instruction, the client device 104 increments maxStamp and sets the stamp of the identifier to the new max Stamp value. When the client device 104 receives editing instructions from the network or the productivity server 100, the client device 104 sets the maxStamp to the largest-seen stamp for the incoming editing instruction. This process ensures that when the client device 104 generates an identifier, that identifier's stamp will be larger than any stamp the client device 104 has yet seen.

In still other embodiments, the client device 104 further assigns a cause identifier as a part of the identifier of the user editing instruction. The cause identifier is an identifier of a prior editing instruction in the causal tree structure that precedes the additional node in which the user editing instruction resides.

In an embodiment, the client device 104 composes (e.g., processes and renders) the document by traversing identifiers of the editing instructions in the portion of the causal tree structure in a sequential order.

In various embodiments, the user editing instruction may include an instruction to modify a series of consecutive data in the document.

In an embodiment, the user editing instruction of the client device 104 and the other user editing instruction of the client device 106 may share a cause identifier, where the cause identifier is an identifier of a prior editing instruction in the causal tree structure that precedes both the user editing instruction and the other user editing instruction.

In still another embodiment, the client device 104 receives a next user editing instruction, and assigns an identifier to the next user editing instruction based on the identifier assigned to the user instruction and the identifier assigned to the other user instruction.

Figure 14:
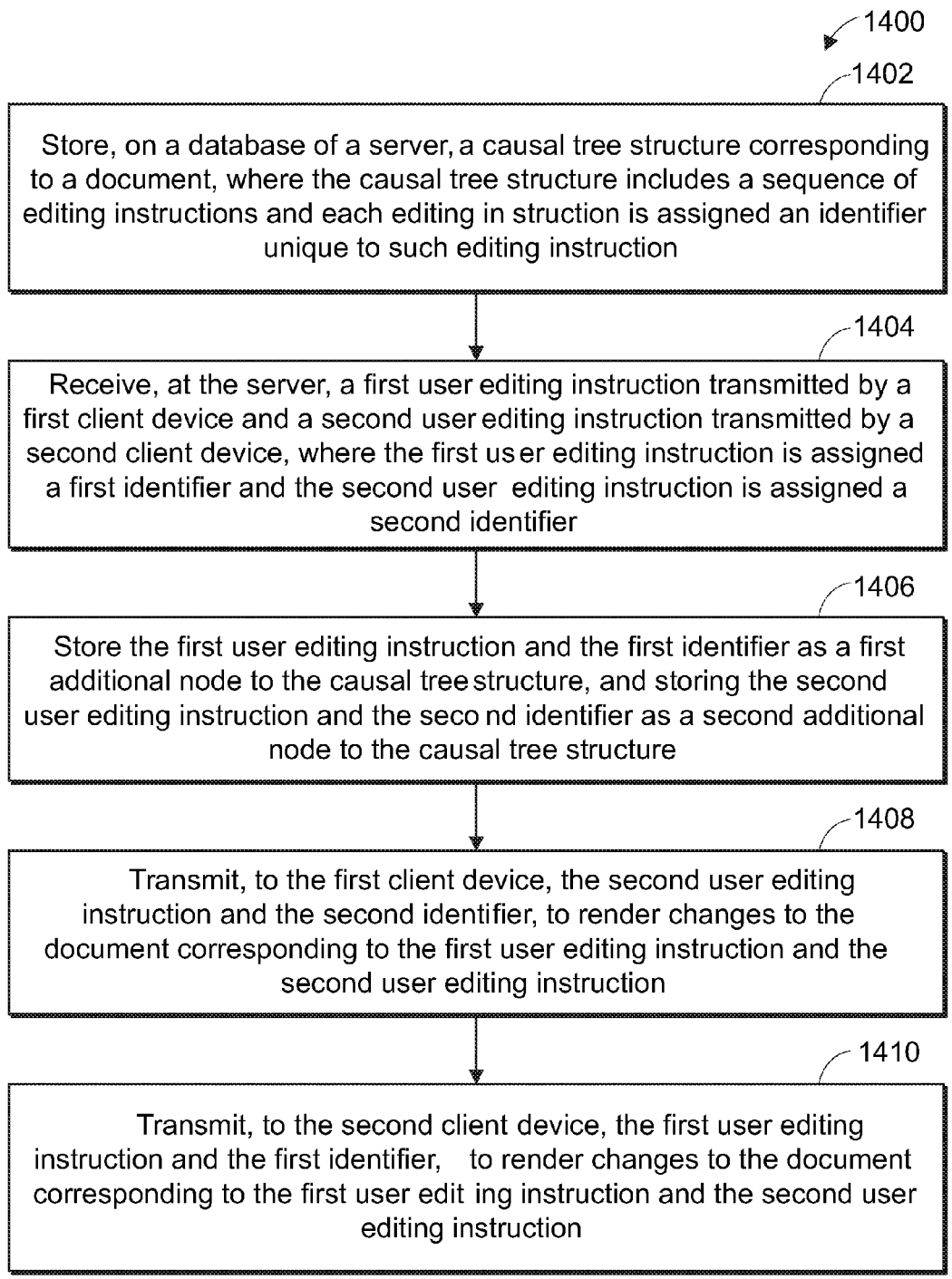
FIG. 14 is a flowchart illustrating another example method, implemented on a server, for editing a document, according to an embodiment.

FIG. 14 is a flowchart illustrating another example method, implemented on a server, for editing a document, according to an embodiment. In some embodiments, the method 1400 is implemented by the productivity server 100 of FIG. 1A, which interacts with the database server 110 and the client devices 104, 106, 108. FIG. 14 is described with reference to FIG. 1A for explanatory purposes. In other embodiments, however, the method 1400 is implemented by another suitable computing device.

At 1402, the productivity server 100 stores, on a database of the productivity server 100 or the database server 110, a causal tree structure corresponding to a document. The causal tree structure includes a sequence of editing instructions and each editing instruction is assigned an identifier unique to such editing instruction. At 1404, the productivity server 1404 receives a first user editing instruction transmitted by a first client device (e.g., client device 104) and a second user editing instruction transmitted by a second client device (e.g., client device 106). The first user editing instruction is assigned a first identifier (e.g., by the first client device) and the second user editing instruction is assigned a second identifier (e.g., by the second client device). At 1406, the productivity server 100 stores, via its processor 130, the first user editing instruction and the first identifier as a first additional node to the causal tree structure, and stores the second user editing instruction and the second identifier as a second additional node to the causal tree structure.

At 1408, the productivity server 100 transmits, to the first client device, the second user editing instruction and the second identifier, to render changes to the document corresponding to the first user editing instruction and the second user editing instruction. At 1410, the productivity server 100 transmits, to the second client device, the first user editing instruction and the first identifier, to render changes to the document corresponding to the first user editing instruction and the second user editing instruction.

According to the method 1400, if both the first user and the second user are editing the same portion of the document, both users' editing instructions are used to update the causal tree structure stored on the server and the copies of the causal tree structure (or copies of a branch of the causal tree structure) at the users' client devices. This ensures that the user edits converges and that both users are editing the same revision of the document.

In an embodiment, the first identifier may include a first site identifier unique to a first user's editing session on the first client device, and a first stamp, which is a numeric value (e.g., an integer value) based on identifiers assigned to editing instructions in the causal tree structure. The second identifier may include a second site identifier unique to a second user's editing session on the second client device, and a second stamp, which is a numeric value (e.g., an integer value) based on identifiers assigned to editing instructions in the causal tree structure.

In another embodiment, the first identifier may further include a first cause identifier, which is an identifier of a prior editing instruction in the causal tree structure that precedes the first user editing instruction. The second identifier may further include a second cause identifier, which is an identifier of a prior editing instruction in the causal tree structure that precedes the second user editing instruction.

In an embodiment where the first cause identifier and the second cause identifier are the same, the productivity server 100 compares the first stamp and the second stamp. If the first stamp is greater than the second stamp, the productivity server 100 processes the first user editing instruction before processing the second user editing instruction. If the first stamp is less than the second stamp, the productivity server 100 processes the second user editing instruction before processing the first user editing instruction.

In still another embodiment, when the first user editing instruction and the second user editing instruction are received by the productivity server 100 simultaneously, the productivity server 100 compares the first site identifier and the second site identifier. If the first site identifier is less than the second site identifier, the productivity server 100 processes the first user editing instruction before processing the second user editing instruction. If the first site identifier is greater than the second site identifier, the productivity server processes the second user editing instruction before processing the second user editing instruction.

In still another embodiment, the first identifier may include a first time stamp and the second identifier may include a second time stamp. The productivity server 100 compares the first time stamp and the second time stamp. If the first time stamp has an earlier time than the second time stamp, the productivity server 100 processes the first user editing instruction before processing the second user editing instruction. If the first time stamp has a later time than the second time stamp, the productivity server 100 processes the second user editing instruction before processing the first user editing instruction.

Figure 15:
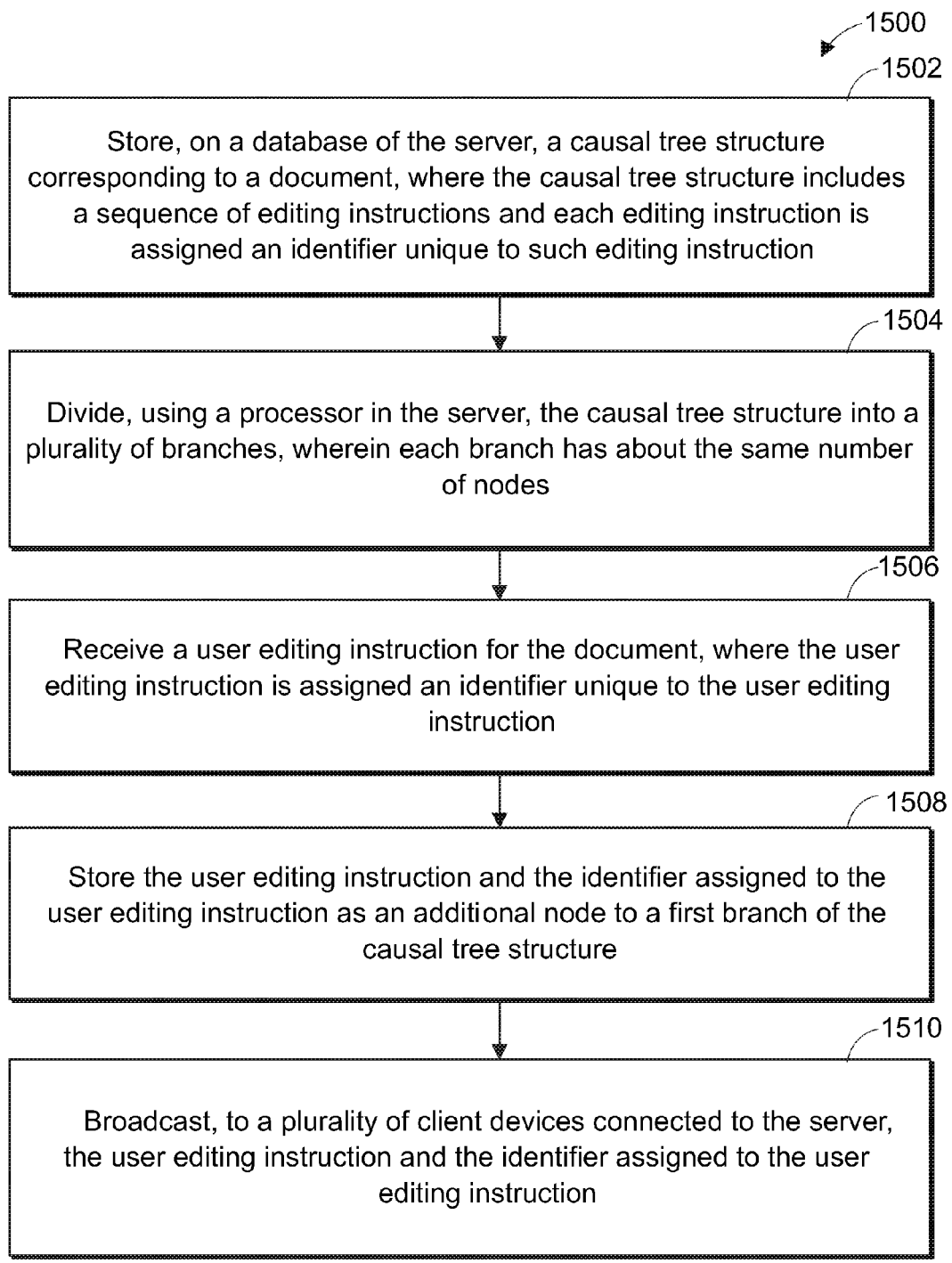
FIG. 15 is a flowchart illustrating yet another example method, implemented on a server, for editing a document, according to an embodiment.

FIG. 15 is a flowchart illustrating yet another example method 1500, implemented on a server, for editing a document, according to an embodiment. In some embodiments, the method 1500 is implemented by the productivity server 100 of FIG. 1A, which interacts with the database server 110 and the client devices 104, 106, 108. FIG. 15 is described with reference to FIG. 1A for explanatory purposes. In other embodiments, however, the method 1500 is implemented by another suitable computing device.

At 1502, the productivity server 100 stores, on a database of the productivity server 100 or the database server 110, a causal tree structure corresponding to a document. The causal tree structure includes a sequence of editing instructions and each editing instruction is assigned an identifier unique to such editing instruction. At 1504, the productivity server 100 divides, using its processor 130, the causal tree structure into a plurality of branches, where each branch has about the same number of editing instructions.

At 1506, the productivity server 100 receives a user editing instruction for the document, where the user editing instruction is assigned an identifier unique to the user editing instruction. At 1508, the productivity server 100 stores the user editing instruction and the identifier assigned to the user editing instruction as an additional node to a first branch of the causal tree structure. At 1510, the productivity server 100 broadcasts, to a plurality of client devices connected to the server, the user editing instruction and the identifier assigned to the user editing instruction.

In an embodiment, the productivity server 100 compares a number of editing instructions in the first branch of the causal tree structure to a predetermined number. If the number of editing instructions in the first branch exceeds the predetermined number, the productivity server 100 re-divides (e.g., re-balances) the causal tree structure into a second plurality of branches having about the same number of editing instructions.

In another embodiment, the productivity server 100 re-divides the causal tree structure when all user sessions to edit the document are terminated.

In yet another embodiment, the productivity server 100 temporarily suspend all user sessions to edit the document when re-dividing or re-balancing the causal tree structure.

In an embodiment, the re-divided causal tree structure may have a different number of branches than the causal tree structure.

In still another embodiment, the identifier assigned to each editing instruction may include an instruction identifier and a cause identifier. The productivity server 100 re-divides the causal tree structure by modifying cause identifiers of first editing instructions in the second plurality of branches without modifying the instruction identifiers of the first editing instructions.

In various embodiments, the causal tree structure also may be used to represent other metadata such as for use in formatting rendering of the data, or for capturing semantic information. It may contain metadata useful for other purposes such as for generating footnotes or even other documents in other data formats such as HTML, XML, XBRL, and iXBRL. In another embodiment, characters may represent data used to control access to the CauseID supporting such features as redacting content. The causal tree structure can be extended and adapted to all kinds of documents.

In still other embodiment, the causal tree structure may be used to represent various types of documents and objects such as a presentation or structured drawing. For instance, a presentation may include object of various types, e.g., text object, spreadsheet/table object, images. In an embodiment, each object may have its own causal tree structure. In another embodiment, each object may be a branch in causal tree structure for the presentation. The layout of these objects and the relationship between them may also be captured by the causal tree. In yet other embodiments, the causal tree may be used to link objects in different documents together. In still other embodiments, a node of a causal tree in one document may be a link to another separate and unrelated causal tree in another document. In other words, a causal tree may include an instruction that refers to nodes and branches of another causal tree or an entire other causal tree.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises", "comprising", "includes", "including", "has", and "having", as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first", "second", etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method implemented on a server, the method comprising:
    storing, on a database of the server, a causal tree structure corresponding to a document, wherein the causal tree structure comprises a sequence of editing instructions and each editing instruction is assigned an identifier unique to such editing instruction, wherein the identifier comprises:
        a site identifier unique to an editing session of a user;
        a stamp, which is a numeric value based on identifiers assigned to editing instructions in the causal tree structure; and
        a cause identifier, wherein the cause identifier is an identifier of a prior editing instruction in a node in the causal tree structure that precedes an additional node;
    receiving, at the server, a user editing instruction for the document, wherein the user editing instruction is assigned an identifier unique to the user editing instruction;
    storing, using a processor of the server, the user editing instruction and the identifier assigned to the user editing instruction as the additional node to the causal tree structure; and
    broadcasting, to a plurality of client devices connected to the server, the user editing instruction and the identifier assigned to the user editing instruction.

2. The method of claim 1, wherein the document is composed by traversing identifiers of the editing instructions in a sequential order.

3. The method of claim 1, wherein the user editing instruction comprises an instruction to modify a series of consecutive data in the document.

4. The method of claim 1, wherein each editing instruction in the causal tree structure comprises at least one instruction selected from the group consisting of a modification of a value, a modification of metadata, a link to another node of the causal tree structure, a link to a node in another causal tree structure corresponding to another document, a link to the other causal tree, and a link to data residing outside the causal tree structure.

5. The method of claim 1, wherein the causal tree structure includes an editing instruction that is assigned a cause identifier, wherein the cause identifier is an identifier of the prior editing instruction.

6. The method of claim 5, wherein the causal tree structure further includes a second editing instruction that is assigned the same cause identifier as the editing instruction, and the editing instruction and the second editing instruction form separate branches of the causal tree structure.

7. A method implemented on a client device, the method comprising:
    receiving, from a server connected to the client device, at least a portion of a causal tree structure corresponding to a document, wherein the causal tree structure is stored on the server and comprises a sequence of editing instructions and each editing instruction is assigned an identifier unique to such editing instruction;
    storing the portion of the causal tree structure;
    receiving a user editing instruction for the document;
    assigning, using a processor of the client device, an identifier to the user editing instruction, including:
        a site identifier unique to the user's editing session on the client device; and
        a stamp, which is a numeric value based on identifiers assigned to editing instructions in the causal tree structure stored on the server;
    transmitting, to the server, the user editing instruction and the identifier assigned to the user editing instruction;
    receiving, from the server, another user editing instruction for the document and an identifier assigned to the other user editing instruction;
    storing the user editing instruction and the identifier assigned to the user instruction, and the received other user editing instruction and the received identifier as additional nodes to the portion of the causal tree structure; and rendering the user editing instruction and the received other user instruction.

8. The method of claim 7, wherein assigning the identifier to the user editing instruction further comprises assigning a cause identifier, wherein the cause identifier is an identifier of a prior editing instruction in the causal tree structure that precedes the additional node.

9. The method of claim 7, further comprising composing the document by traversing identifiers of the editing instructions in the portion of the causal tree structure in a sequential order.

10. The method of claim 7, wherein the user editing instruction comprises an instruction to modify a series of consecutive data in the document.

11. The method of claim 7, wherein each editing instruction in the causal tree structure comprises at least one instruction selected from the group consisting of a modification of a value, a modification of metadata, a link to another node of the causal tree structure, a link to a node in another causal tree structure corresponding to another document, a link to another causal tree structure, and a link to data residing outside the causal tree structure.

12. The method of claim 7, wherein the user editing instruction and the other user editing instruction share a cause identifier, wherein the cause identifier is an identifier of a prior editing instruction in the causal tree structure that precedes both the user editing instruction and the other user editing instruction.

13. The method of claim 7, further comprising:
receiving a next user editing instruction; and
assigning an identifier to the next user editing instruction based on the identifier assigned to the user instruction and the identifier assigned to the other user instruction.

14. A method implemented on a server, the method comprising:
storing, on a database of the server, a causal tree structure corresponding to a document, wherein the causal tree structure comprises a sequence of editing instructions and each editing instruction is assigned an identifier unique to such editing instruction;
receiving, at the server, a first user editing instruction transmitted by a first client device and a second user editing instruction transmitted by a second client device, wherein the first user editing instruction is assigned a first identifier and the second user editing instruction is assigned a second identifier,
wherein the first identifier comprises a first site identifier unique to a first user's editing session on the first client device, and a first stamp, which is a numeric value based on identifiers assigned to editing instructions in the causal tree structure,
wherein the second identifier comprises a second site identifier unique to a second user's editing session on the second client device, and a second stamp, which is a numeric value based on identifiers assigned to editing instructions in the causal tree structure;
storing the first user editing instruction and the first identifier as a first additional node to the causal tree structure, and storing the second user editing instruction and the second identifier as a second additional node to the causal tree structure;
transmitting, to the first client device, the second user editing instruction and the second identifier, to render changes to the document corresponding to the first user editing instruction and the second user editing instruction; and transmitting, to the second client device, the first user editing instruction and the first identifier, to render changes to the document corresponding to the first user editing instruction and the second user editing instruction.

15. The method of claim 14, wherein:
the first identifier further comprises a first cause identifier, which is an identifier of a prior editing instruction in the causal tree structure that precedes the first user editing instruction; and
the second identifier further comprises a second cause identifier, which is an identifier of a prior editing instruction in the causal tree structure that precedes the second user editing instruction.

16. The method of claim 15, wherein the first cause identifier and the second cause identifier are the same, and the method further comprises:
comparing the first stamp and the second stamp;
if the first stamp is greater than the second stamp, processing the first user editing instruction before processing the second user editing instruction; and
if the first stamp is less than the second stamp, processing the second user editing instruction before processing the first user editing instruction.

17. The method of claim 15, wherein the first user editing instruction and the second user editing instruction are received simultaneously, and the method further comprises:
comparing the first site identifier and the second site identifier;
if the first site identifier is less than the second site identifier, processing the first user editing instruction before processing the second user editing instruction; and
if the first site identifier is greater than the second site identifier, processing the second user editing instruction before processing the second user editing instruction.

18. The method of claim 14, wherein the first identifier further comprises a first time stamp and the second identifier further comprises a second time stamp, and the method further comprises:
comparing the first time stamp and the second time stamp;
if the first time stamp has an earlier time than the second time stamp, processing the first user editing instruction before processing the second user editing instruction; and
if the first time stamp has a later time than the second time stamp, processing the second user editing instruction before processing the first user editing instruction.

19. The method of claim 14, wherein each editing instruction in the causal tree structure comprises at least one instruction selected from the group consisting of a modification of a value, a modification of metadata, a link to another node of the causal tree structure, a link to a node in another causal tree structure corresponding to another document, a link to another causal tree structure, and a link to data residing outside the causal tree structure.

20. A method implemented on a server, the method comprising:
storing, on a database of the server, a causal tree structure corresponding to a document, wherein the causal tree structure comprises a sequence of editing instructions and each editing instruction is assigned an identifier unique to such editing instruction;

dividing, using a processor on the server, the causal tree structure into a plurality of branches, wherein each branch has about the same number of editing instructions;

receiving a user editing instruction for the document, wherein the user editing instruction is assigned an identifier unique to the user editing instruction;

storing the user editing instruction and the identifier assigned to the user editing instruction as an additional node to a first branch of the causal tree structure;

broadcasting, to a plurality of client devices connected to the server, the user editing instruction and the identifier assigned to the user editing instruction;

comparing a number of editing instructions in the first branch of the causal tree structure to a predetermined number; and if the number of editing instructions in the first branch exceeds the predetermined number, re-dividing the causal tree structure into a second plurality of branches having about the same number of editing instructions, wherein the causal tree structure is re-divided when all user sessions to edit the document are terminated.

21. The method of claim 20, further comprising temporarily suspending all user sessions to edit the document when re-dividing the causal tree structure.

22. The method of claim 20, wherein the re-divided causal tree structure has a different number of branches than the causal tree structure.

23. The method of claim 20, wherein the identifier assigned to each editing instruction comprises an instruction identifier and a cause identifier.

24. The method of claim 23, wherein re-dividing the causal tree structure comprises modifying cause identifiers of first editing instructions in the second plurality of branches without modifying the instruction identifiers of the first editing instructions.

* * * * *